US006592456B2

(12) United States Patent
Walker et al.

(10) Patent No.: US 6,592,456 B2
(45) **Date of Patent: *Jul. 15, 2003**

(54) VIDEO POKER SYSTEM AND METHOD

(75) Inventors: Jay S. Walker, Ridgefield, CT (US); James A. Jorasch, Stamford, CT (US); Magdalena Mik, Greenwich, CT (US); Jason Krantz, Wilton, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/858,987

(22) Filed: May 16, 2001

(65) Prior Publication Data

US 2001/0023199 A1 Sep. 20, 2001

Related U.S. Application Data

(63) Continuation of application No. 09/165,184, filed on Oct. 2, 1998, now Pat. No. 6,257,979.

(51) Int. Cl.[7] ............................ A63F 13/00; A63F 1/00

(52) U.S. Cl. ......................................... 463/13; 273/292

(58) Field of Search ................................ 463/1, 12–13, 463/16, 18, 20, 22, 25–26, 30–31, 37, 43–44, 46, 40–42; 273/138.1, 143 R, 292

(56) References Cited

U.S. PATENT DOCUMENTS

| | | | | |
|---|---|---|---|---|
| 4,743,022 A | | 5/1988 | Wood | 273/85 |
| 5,531,441 A | | 7/1996 | Dabrowski et al. | 463/12 |
| 5,542,669 A | | 8/1996 | Charron et al. | 463/13 |
| 5,732,950 A | * | 3/1998 | Moody | 273/292 |
| 5,769,716 A | | 6/1998 | Saffari et al. | 463/20 |
| 5,772,506 A | | 6/1998 | Marks et al. | 463/13 |
| 5,816,914 A | * | 10/1998 | Wichinsky | 463/13 |
| 6,048,267 A | | 4/2000 | Wichinsky | 463/13 |
| 6,050,568 A | | 4/2000 | Hachquet | 273/292 |
| 6,179,711 B1 | * | 1/2001 | Yoseloff | 463/25 |

* cited by examiner

*Primary Examiner*—Kim Nguyen
(74) *Attorney, Agent, or Firm*—Michael D. Downs; Dean P. Alderucci

(57) ABSTRACT

A method is disclosed for operating a video poker machine which includes the steps of populating a primary poker hand with a plurality of playing cards, identifying discard cards to be discarded from the populated primary poker hand, populating a secondary poker hand with the discard cards, populating the primary poker hand to replace the discard cards discarded therefrom, thereby forming a final primary poker hand, and determining a payout based at least upon the playing cards in the final primary poker hand.

31 Claims, 21 Drawing Sheets

32

| OUTCOME | PAYOUT (104) | | | | | DISCARD HAND BONUS (106) |
|---|---|---|---|---|---|---|
| | 1 COIN WAGER | 2 COIN WAGER | 3 COIN WAGER | 4 COIN WAGER | 5 COIN WAGER | |
| ROYAL FLUSH | 250 | 500 | 750 | 1000 | 4000 | 200 |
| STRAIGHT FLUSH | 50 | 100 | 150 | 200 | 250 | 50 |
| FOUR OF A KIND | 25 | 50 | 75 | 100 | 125 | 25 |
| FULL HOUSE | 9 | 14 | 27 | 36 | 45 | 20 |
| FLUSH | 6 | 12 | 18 | 24 | 30 | 15 |
| STRAIGHT | 4 | 8 | 12 | 16 | 20 | 10 |
| THREE OF A KIND | 3 | 6 | 9 | 12 | 15 | 5 |
| TWO PAIR | 2 | 4 | 6 | 8 | 10 | 0 |

FIG. 3

VIDEO POKER SYSTEM AND METHOD

This application is a continuation of co-pending, commonly-owned U.S. patent application Ser. No. 09/165,184, entitled "VIDEO POKER SYSTEM AND METHOD", which was filed on Oct. 2, 1998, and which issued as U.S. Pat. No. 6,257,979.

BACKGROUND OF THE INVENTION

1. Field of the Invention

The present invention relates generally to casino gaming devices, and more particularly, to a system and method for playing video poker.

2. Background of the Related Art

Slot machines are highly profitable for casinos in the United States. In 1997, they accounted for more than $10 billion of total casino revenue. With individual slot machines typically earning between $50 and $150 per day, slot machines often account for well over one-half of the overall profits of most casinos. If past performance is any indication, interest in slot machines is growing. This can be attributed in large part to the development of electronic-type slot machines, such as those simulating various video poker games. Many players find video poker machines to be a more interesting alternative to traditional slot machines because they allow the player to make decisions throughout the game.

The earliest devised draw poker machines basically replicated a game of cards played at a table. More specifically, after placing a wager on a hand (i.e., inserting a predetermined number of coins) early video poker machines dealt playing cards from a standard fifty-two (52) card poker deck and displayed a single five (5) card hand to the player on a display screen. Thereafter, the player selected which of the five (5) playing cards he wanted to hold. Replacement cards were then dealt and displayed. Finally, the machine determined the player's winnings for the resulting five card hand based on a conventional poker hand ranking scheme.

More recent developments in video poker devices have attempted to enhance the game playing experience by providing secondary game elements.

For example, one such video poker gaming device is disclosed in U.S. Pat. No. 4,743,022 to Wood. The poker game described involves a casino-type poker game, wherein a player makes a wager and is dealt a first hand of five cards face up. Thereafter, the player elects to discard any of the five cards in the first hand and have them replaced with an equal number of new cards. The refreshed hand (i.e., the original cards held and the replacement cards) forms a second hand. The player either loses the wager, receives the wager back ("push"), or receives a payout that varies in amount depending upon the ranking of the cards in the hand. The player may next make a second wager and receive a sixth card so as to make a third hand that includes the sixth card plus any four cards of the second hand. Another payout scheme is included for this third hand, which depends on the ranking thereof.

Another example of a prior art video poker game is disclosed in U.S. Pat. No. 5,531,441 to Dabrowski et al. The electronic video gaming machine disclosed provides a display of two distinct draw poker hands at the beginning of game play. Initially, a player achieves a payout if one or more of the cards in the first hand match one or more of the cards in the second hand. After the matching payouts are made, the player selects one of the hands to play by pressing buttons on the gaming machine. The unselected hand is removed from the display. The player then plays out the selected hand according to the conventional rules of draw poker.

The prior art video poker machines have several disadvantages. Specifically, prior art video poker machines have provided a player with little incentive to deviate from traditional strategies. Additionally, prior art video poker machines do nothing to encourage players to extend their gaming sessions.

Accordingly, there is a need in the art for a video poker system and method that engages a player during game play. There is also a need in the art for a system and method that encourages a player to play longer sessions while at the same time maintaining acceptable payback percentages for casinos. Further, there is a need in the art for a system and method that enables players to develop a variety of gaming strategies so as to generate more interesting and exciting playing action for gaming patrons. These and other unique features of the system and method disclosed herein will become more readily apparent from the following description.

SUMMARY OF THE DISCLOSURE

The subject invention is directed to a novel and unique system and method for operating a video poker machine. The present system and method are adapted and configured to enhance and prolong a gaming session, thereby improving the gambling experience as well as the profitability of the video poker machine.

The system includes a memory storage device adapted and configured to store a primary payout schedule associated with a primary poker hand and a secondary payout schedule associated with a secondary poker hand. The system further includes a processor in communication with the memory storage device which is adapted and configured to populate a primary poker hand with a plurality of playing cards, identify discard cards to be discarded from the populated primary poker hand, populate a secondary poker hand with the discard cards, and populate the primary poker hand to replace the discard cards discarded therefrom; thereby forming a final primary poker hand. In an embodiment of the present invention, the processor is adapted and configured to determine a payout based upon the playing cards in the final primary poker hand and the secondary poker hand utilizing the primary payout schedule and the secondary payout schedule, respectively.

A method of operating a video poker machine in accordance with the present invention includes the steps of populating a primary poker hand with a plurality of playing cards each having a respective card position, identifying discard cards to be discarded from the populated primary poker hand, populating a secondary poker hand associated with each card position with the playing cards discarded from such card position, populating the primary poker hand to replace the discard cards discarded therefrom so as to form a final primary poker hand, and determining a payout based at least upon the playing cards in the final primary poker hand. In addition, the method includes the step of determining a payout based upon the playing cards in at least one of the secondary poker hands.

In the subject method, the step of populating a secondary poker hand associated with each card position of the primary poker hand may comprise randomly populating a card position or only populating an unpopulated card position in such secondary poker hand. In the former case, the method would include the step of replacing a playing card in the secondary poker hand with a discarded playing card from the primary poker hand if the card position is already filled with a playing card. In either instance, the method would further include the step of determining a payout based upon the playing cards in at least one fully populated secondary poker hand. Preferably, the method further includes the step of receiving a request to analyze the playing cards in at least one of the secondary poker hands to determine a payout based thereupon.

These and other unique features of the system and method disclosed herein will become more readily apparent from the following description of the drawings.

BRIEF DESCRIPTION OF THE DRAWINGS

So that those having ordinary skill in the art to which the disclosed system and method pertains will more readily understand how to employ and use the same, reference may be had to the drawings wherein:

FIG. 3 is a sample of a payout schedule associated with the video poker gaming device of FIG. 2 and arranged in accordance with the present invention;

Figure 1:
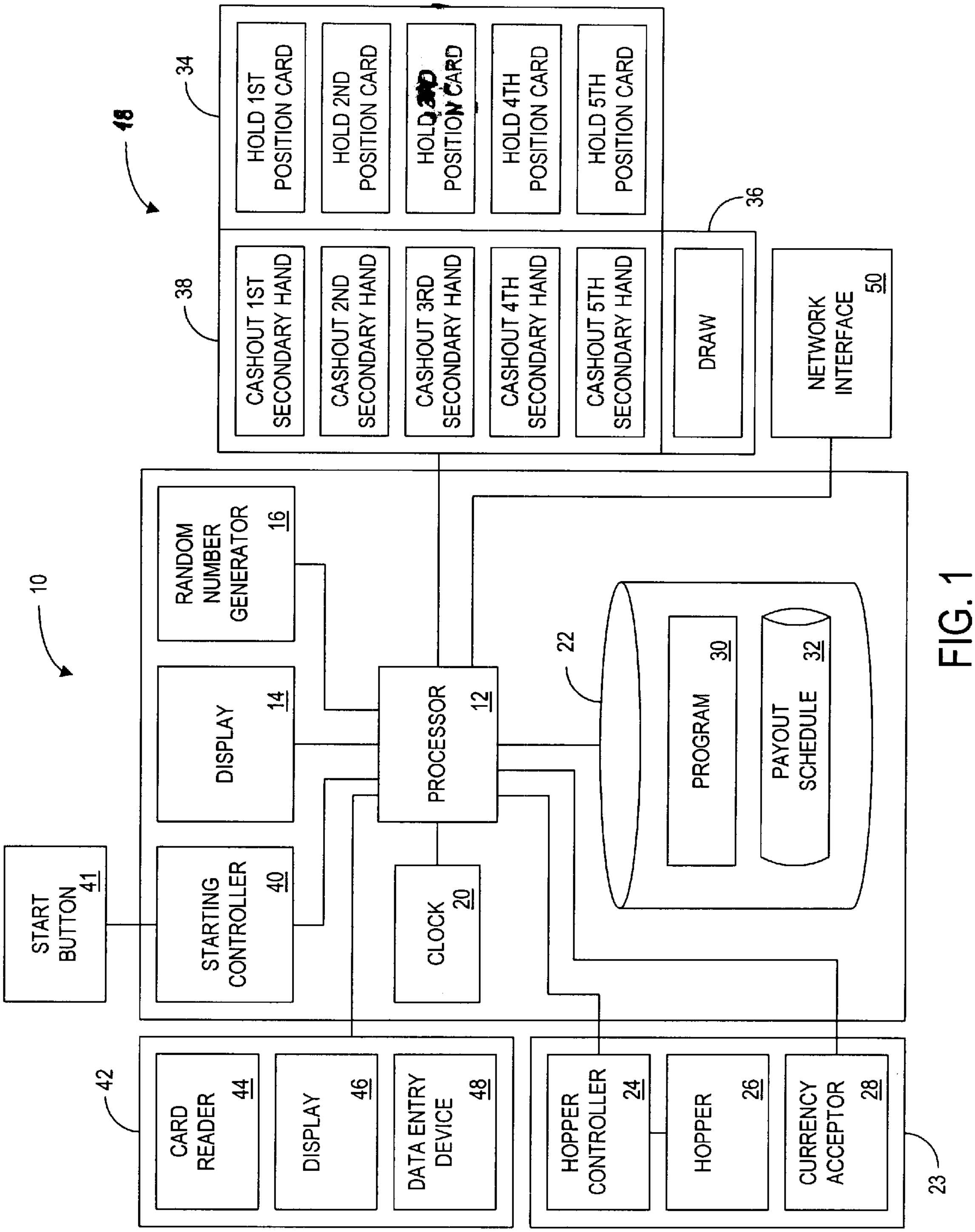
FIG. 1 is a schematic representation of a video poker gaming device configured in accordance with an embodiment of the present invention.

These and other features of the system and method disclosed herein will become more readily apparent to those having ordinary skill in the art from the following detailed description of the embodiments taken in conjunction with the drawings.

DETAILED DESCRIPTION OF THE PREFERRED EMBODIMENTS

The present invention provides a novel and unique system and method for playing video poker which serves to prolong gaming sessions, thereby increasing the profitability of the casino.

Throughout the specification that follows, the term "video poker machine" includes, but is not limited to, the various programmable video-game apparatus including a video lottery terminal. In addition, the term "standard deck of playing cards" refers to a collection of fifty-two (52) cards comprising four (4) sets of cards identified by the characters 2 through 10, jack ("J"), queen ("Q"), king ("K"), and ace ("A"). Each of the four (4) sets of cards is differentiated by one of four (4) suits, namely, a spade ("s"), club ("c"), heart ("h"), or diamond ("d"). One or more jokers may also be included for use as the highest card or as a wild card. Reference to a deck of playing cards, unless specified otherwise, shall include one or more decks of playing cards. One or more decks can also be used in a single game. An "infinite" deck of playing cards refers to a deck wherein any single playing card can be dealt a repeated number of times.

Also throughout the specification, the term "primary poker hand" shall refer to a collection of cards that receive playing cards directly from a standard deck of playing cards. A card is discarded and becomes a "discard card" when a game player decides not to retain or "hold" the card in the primary poker hand. Discard cards are not eliminated from the game, but instead create one or more "secondary poker hands." Each secondary poker hand includes one or more discard cards. In one embodiment, discard cards can replace cards previously placed into a secondary poker hand. Cards that are replaced in a secondary poker hand may either be eliminated from the poker game or create one or more third, or "tertiary," poker hands. Each tertiary poker hand includes one or more replaced cards from a secondary poker hand. Additional poker hands, e.g., a fourth group of playing cards that are collected from the tertiary poker hand(s), may be created in a similar manner.

Various alternate embodiments that are within the spirit and scope of the present invention are possible but, for simplicity, will not be described in detail herein. For example, the cards discarded from the primary poker hand by the player may not necessarily drop down into a secondary poker hand. Rather, they may be discarded in the conventional manner by simply being replaced in the primary poker hand without at all contributing to any of the secondary poker hands. Alternatively, a discard card may knock out a whole secondary poker hand, rather than a single card of the secondary poker hand.

The process of adding cards to a poker hand is described herein as "populating" the poker hand, and poker hands having had playing cards added to them are said to have been "populated." For example, a primary poker hand is populated when the hand receives playing cards from the standard deck of playing cards. Also, for example, a secondary poker hand is populated when it receives a discard card from the primary poker hand.

Referring now to the drawings wherein like reference numerals identify similar elements of the present invention, there is illustrated in FIG. 1 a video poker system 10 in the form of a slot machine constructed in accordance with an embodiment of the present invention. Video poker system 10 includes a processor 12 which may comprise one or more commercially available microprocessors, such as Intel Corporation's (Santa Clara, Calif.) Pentium® microprocessor or the like. A video display 14 in the form of a cathode ray tube (CRT), liquid crystal display (LCD), or light emitting diode (LED) display is operably connected to processor 12, along with a random number generator 16, player controls 18, a clock 20, and a data storage device 22. In addition, a set of currency handling devices 23, a starting controller 40 to which is connected a start button 41, a player card interface 42, and a network interface 50 are operably connected to processor 12.

The random number generator 16 is adapted and configured to generate a random or a pseudo-random number to determine, for example, the random selection of cards to form a playing card hand or the position of a playing card within a hand. These aspects will be more fully described hereinbelow. Alternatively, random number generator 16 can be implemented in software and thus random numbers would be generated by the software controlling processor 12. The structure and operation of random number generator 16 is well known in the art.

The currency handling devices 23 include a currency acceptor 28 that is operably connected to processor 12 for signaling the processor upon receipt of currency such as coins, bills, or tokens from a player. Currency acceptor 28 may also be configured to accept forms of non-currency payment such as credit cards, debit cards, smart cards, or the like. A hopper controller 24 is adapted and configured to control the dispensing of money from a hopper 26, typically in the form of coins or tokens, to return change or disperse winnings to a player. The terms coins and tokens are used interchangeably throughout the specification and simply represent a monetary amount. It should be readily understood that a player's winnings may take other forms as well, for example, as credits or points. The structure and operation of hopper controller 24, hopper 26, and currency acceptor 28 are well known in the art.

Data storage device 22 comprises at least one of a selected semiconductor, magnetic, or optical memory components as are well known in the art. The data storage device 22 contains at least a program 30 providing instructions for the operation of processor 12 and a payout schedule 32 for providing an appropriate payout corresponding to the outcome of a particular card game. Player controls 18 and start button 41 are utilized to play a video poker game, to be described in greater detail hereinbelow, by a game player during operation of video poker system 10. Player card interface 42 enables a game player to save and reload information related to the player.

Player controls 18 include primary card hold controls 34, a card draw control 36, and secondary poker hand cashout control buttons 38 each of which are operably connected to processor 12. Each control 34, 36, and 38 is accessible to a player during game participation for furthering game play or altering game strategies as will be described further hereinbelow. Although five (5) primary card hold controls 34 and five (5) secondary poker hand cashout control buttons 38 are shown, an embodiment of the present invention may include more or fewer of each control type.

The starting controller 40 is provided for sending a signal to processor 12 indicating that video poker system 10 has been enabled for play, as is well known in the art. A game player activates starting controller 40 by actuating start button 41. Player card interface 42 is operably associated with processor 12 and includes a card reader 44 for reading a player tracking card (not shown). Player tracking cards of this type may comprise magnetic storage media or optical storage media as is well known in the art. Each player tracking card may include a code stored thereon that identifies the player for various purposes. For example, such purposes may include a code to restart a playing session where a player earlier left off, to credit bonus points to the player during off-peak playing hours, or to credit bonus points for having played for a predetermined amount of time. Such bonus points may subsequently be exchanged for casino merchandise or services, as is well known in the art.

Player card interface 42 further includes a display 46 for providing information to the player and an associated data entry device 48 for enabling a player to communicate with system 10. Display 46 may be in the form of an LCD or LED device and can be used to display bonus information or other targeted messages to a player. Data entry device 48 may be in the form of a numeric keypad, touch screen, or other similar input device. Network interface 50 is operably connected to processor 12 and preferably comprises a communication port or card for enabling communication between multiple video poker systems 10 and a server as will be discussed hereinbelow.

Figure 2:
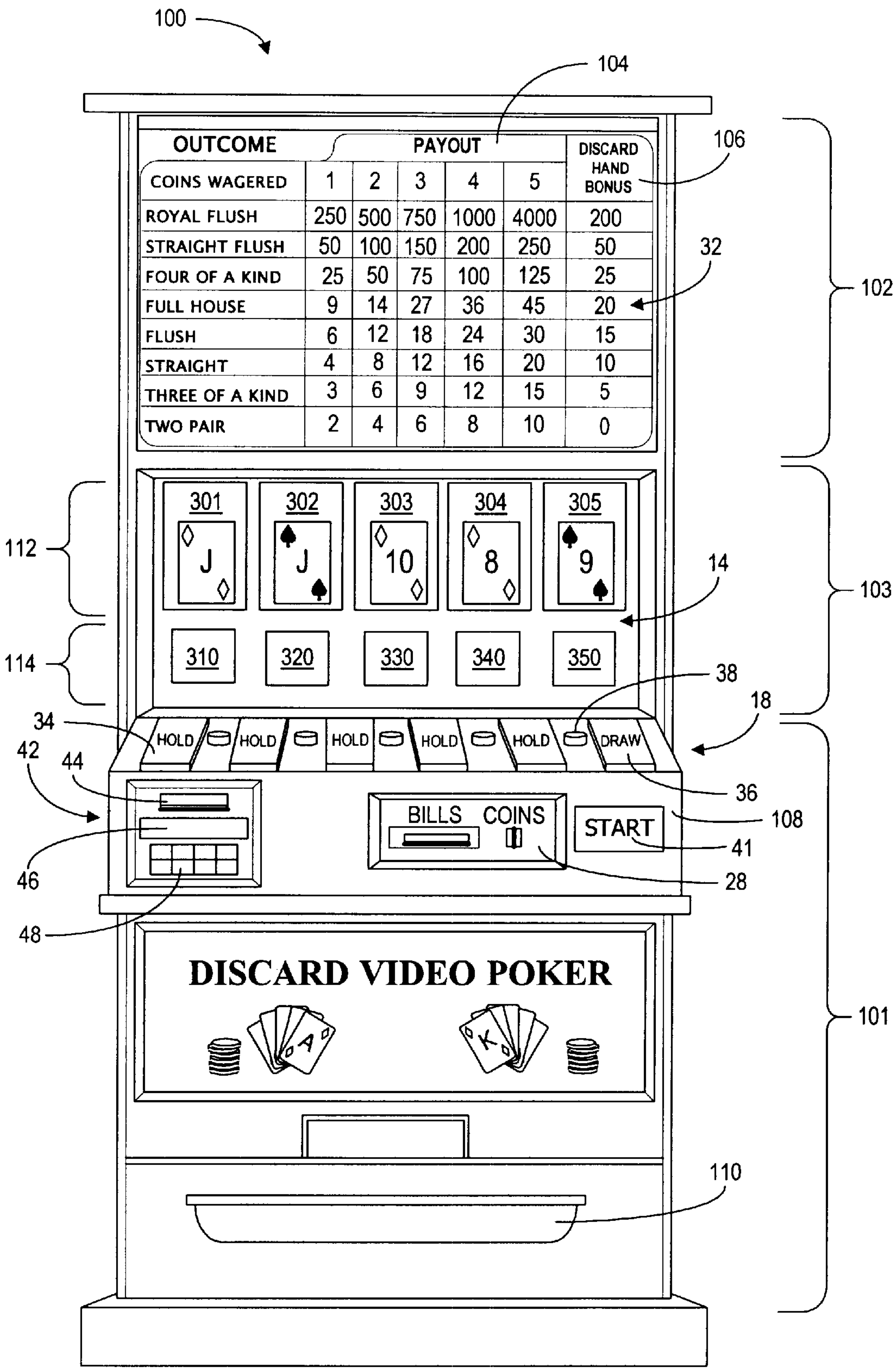
FIG. 2 is a front elevational view of a video poker gaming device configured in accordance with an embodiment of the present invention.

Referring now to FIG. 2, a video poker machine 100 is illustrated comprising the components illustrated in FIG. 1 and described hereinabove. A lower panel 101 of video poker machine 100 supports player controls 18. Below player controls 18 is a front panel 108 supporting player card interface 42, currency acceptor 28, and start button 41. A coin tray 110 is provided below front panel 108 for collecting coins or tokens dispensed from hopper 26.

An upper panel 102 of video poker machine 100 displays the contents of payout schedule 32 which includes a primary poker hand payout schedule 104 (entitled "payout") and a secondary poker hand payout schedule 106 (entitled "discard hand bonus") as illustrated. As noted above, payout schedule 32 is stored in data storage device 22.

Referring to FIG. 3, payout schedule 32 includes a column depicting winning-hand combinations, or "outcomes" (e.g., royal flush, straight flush, four of a kind, etc.), and corresponding payouts for achieving the outcomes. The size of the payout depends on the number of coins wagered as is currently implemented in existing video poker games.

To illustrate payout schedule 32, a player inserting the minimum wager of one (1) coin and ultimately obtaining two pair in his primary poker hand and two pair in one of his secondary poker hands will receive a total payout of two (2) coins (2+0=2 coins). And, as another example, a player who wagers three (3) coins and obtains a full house in his primary poker hand and a straight flush in one of his secondary poker hands will receive a total payout of seventy-seven (77) coins (27+50=77 coins). In another embodiment, the player may not be eligible to receive a payout for a secondary poker hand unless he had wagered the maximum number of coins on the primary poker hand. Payout schedule 32, for example, has a maximum wager of five coins. In yet another embodiment, the amount of the discard hand bonus for any of the secondary poker hands may vary as a function of the number of coins wagered in a similar manner to that illustrated by the payouts for the primary poker hand in payout schedule 32. The method of game play, method by which primary and secondary poker hands are developed, and payout variations related thereto will be described and discussed in detail hereinbelow.

Referring again to FIG. 2, a center panel 103 of video poker machine 100 includes display 14 which includes an image as shown thereon. The upper portion of display 14 includes a graphical representation of a primary poker hand 112 having five (5) card positions, 301 through 305. The lower portion of display 14 includes five (5) secondary poker hands 114 identified as 310 through 350. Each secondary poker hand 310 through 350 is associated with a card position of primary poker hand 112. For example, secondary poker hand 310 is associated with card position 301 and secondary poker hand 320 is associated with card position 302 of primary poker hand 112. In an alternate embodiment of the present invention the secondary poker hands 114 are not associated with any particular card position of primary poker hand 112. Another embodiment of the present invention comprises a primary poker hand 112 having more or less than five (5) card positions and an associated secondary poker hand for each card position. Yet another embodiment comprises a primary poker hand 112 having more or less secondary poker hands 114 associated with each card position of primary poker hand 112. For example, a primary poker hand 112 may have five (5) card positions and one (1) secondary poker hand associated with the primary poker hand 112. In another alternate embodiment, the player may choose which of the possible secondary poker hands, or which position at a particular secondary poker hand, any given discard card will fall into.

Card positions 301 through 305 of primary poker hand 112 are populated by video poker system 10 in any number of ways. For example, each card position 301 through 305 may be populated from a single deck of cards, from five (5) decks of cards that are each dedicated to feeding a different card position, or from an infinite deck of playing cards. Of course, a card having a particular character and suit may turn up several times when more than one deck or when an infinite deck of cards is used. Cards are dealt or distributed under the control of processor 12 and random number generator 16.

An example of a playing session follows to better illustrate a method of playing an embodiment of the present invention and, in addition, to demonstrate a number of its variations. This example is not meant to limit the way in which this game is played, but only for exemplifying the basic concepts of the invention. As will become apparent to one skilled in the art, there are a multitude of variations that can be made from the basic concepts described and claimed herein.

Figure 4:
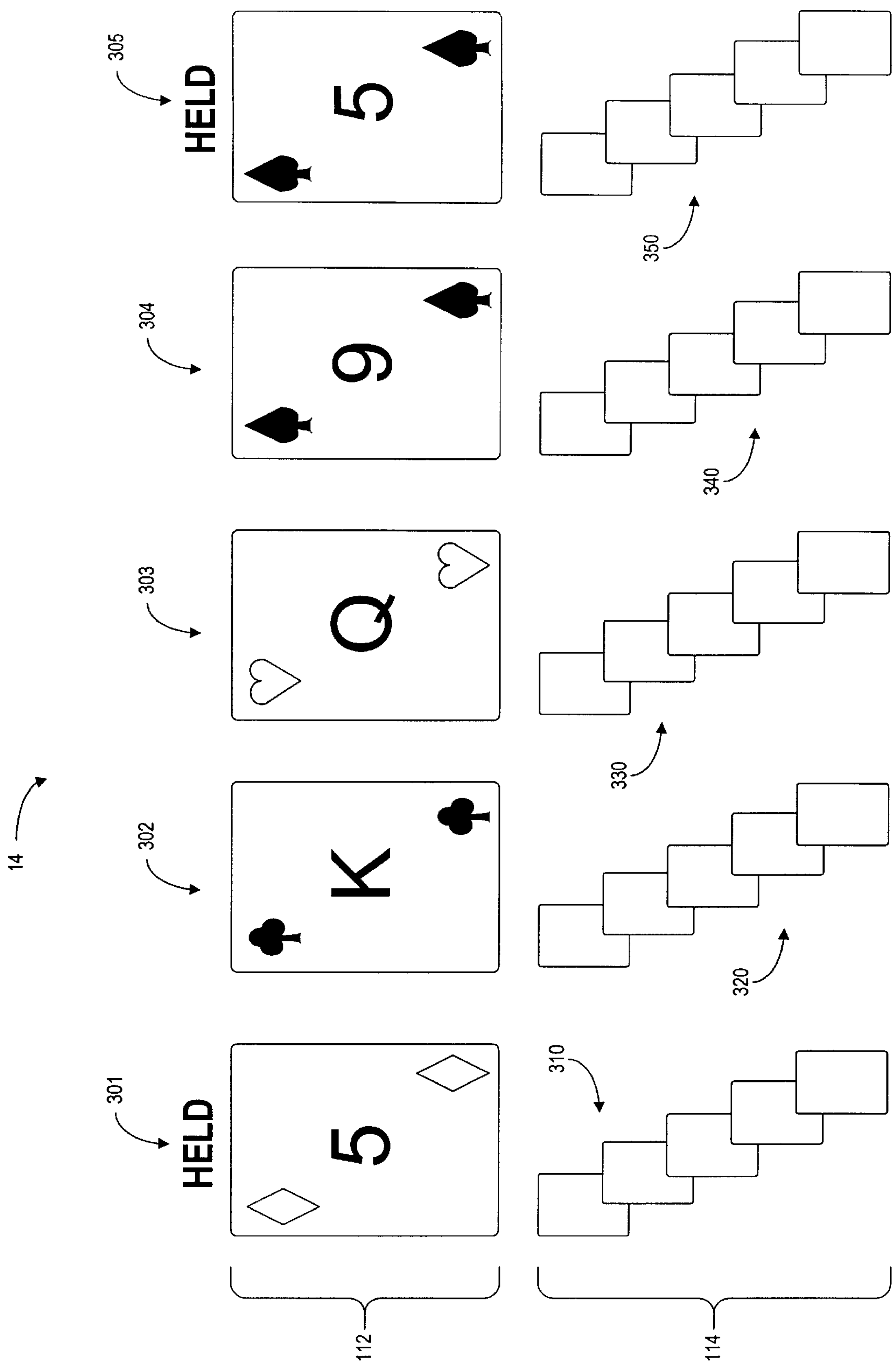
FIGS. 4–19 are successive views of the video display of the video poker gaming device of FIG. 2 during a gaming session.

Referring now to FIGS. 2 and 4, an embodiment of the present invention operates generally as follows. The embodiment described comprises a primary poker hand 112 of five (5) card positions, 301 through 305, and secondary poker hands 114, identified as 310 through 350, for each of the five (5) primary poker hand card positions, 301 through 305. Each secondary poker hand consists of five (5) cards. In addition, each card that is not held (i.e., retained) in primary poker hand 112 is discarded into the secondary poker hand associated therewith. Thus, each of the discard cards populate the secondary poker hands with which they are associated.

In the embodiment that follows, discard cards are randomly discarded from the primary poker hand 112 to the secondary poker hand 114 associated therewith to either fill an empty card position or replace a playing card that already fills a card position. In an alternate embodiment, discard cards are discarded either randomly or sequentially into empty secondary poker hand card positions until all of the empty card positions are filled. Once the secondary poker hand is filled, the discard cards are either randomly or sequentially discarded into the filled secondary poker hand 114. Other various discard combinations including, for example, the above described random and sequential discard techniques, are envisioned. Those cards in the secondary poker hand that are replaced are either eliminated from the game or, as described above, fill additional poker hands (e.g., a tertiary poker hand).

A player activates machine 100 by, for example, feeding bills, coins, or tokens into currency acceptor 28 and actuating start button 41. In the alternative, a player inserts a player tracking card into card reader 44 to register "credits" received either from an earlier game playing session or from a card crediting device (not shown). Such "credits" may be stored on a casino server in association with the code that identifies the player. The machine 100 may read the code off of the player tracking card and retrieve the associated credits from the casino server via network interface 50. Using, for example, data entry device 48, the player may indicate prior to each new primary poker hand 112 being dealt the number of coins that are to be wagered.

Initially, primary poker hand card positions 301 through 305 and secondary poker hands 310 through 350 are void of playing cards. The player presses draw control button 36 signaling processor 12 to deal a hand of cards to card positions 301 through 305 of primary poker hand 112.

After pressing draw control button 36, an initial hand is dealt populating all five (5) card positions of primary poker hand 112. As illustrated in FIG. 4, the primary poker hand 112 includes 5d, Kc, Qh, 9s, and 5s. As is conventional in the art of five card draw poker, the player determines which cards are to be held and, thereby, which are to be discarded. This decision is conveyed to video poker machine 100 by the player pressing the hold control buttons 34 that are associated with each card that is to be held in the primary poker hand 112. In this example, the player holds the 5d and 5s in card positions 301 and 305, respectively. The Kc, Qh, and 9s in card positions 302, 303, and 304, respectively, are discarded.

Figure 5:
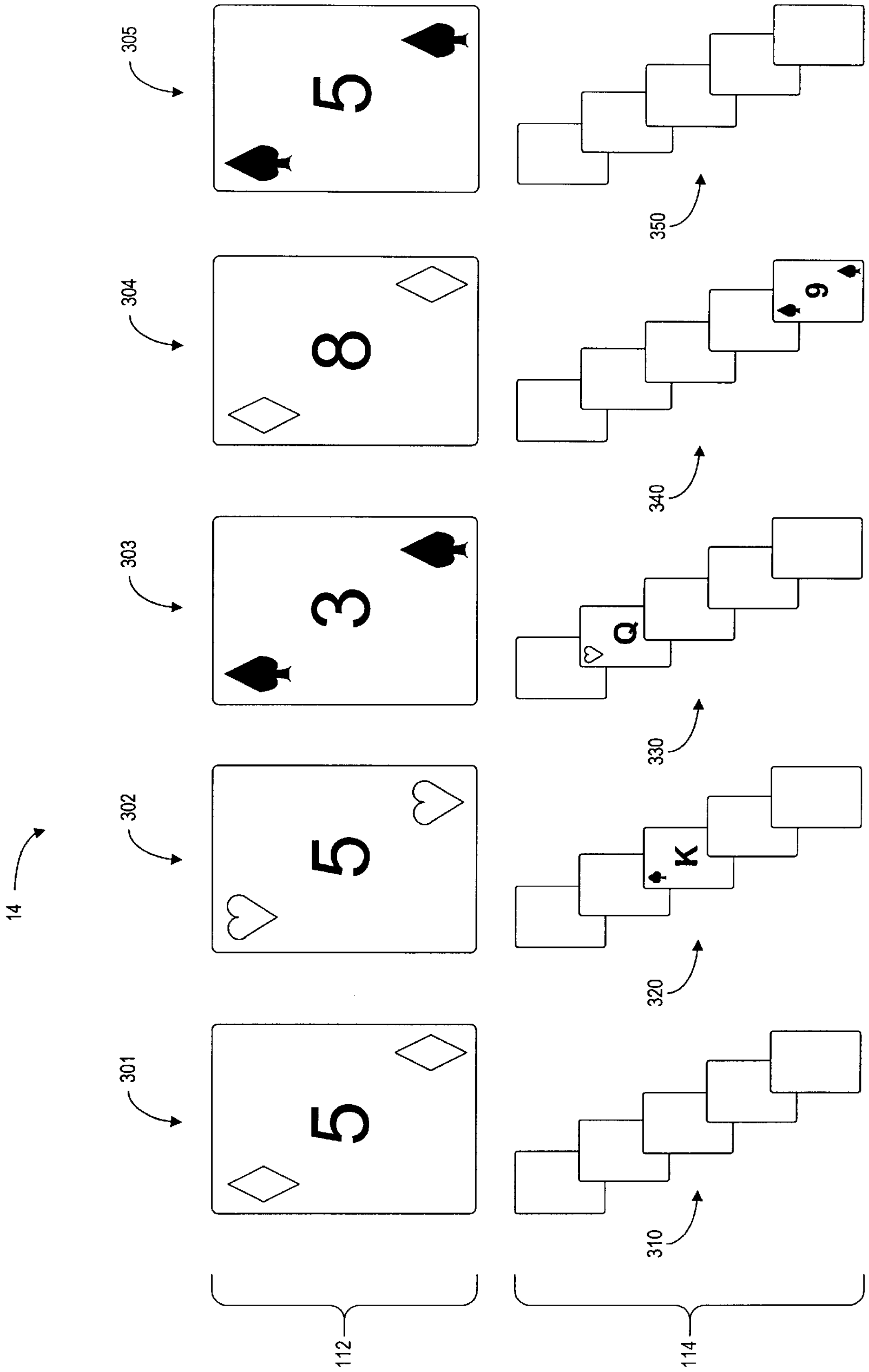

Referring to FIG. 5, upon pressing draw control button 36, the Kc, Qs, and 9s are discarded into random positions of secondary poker hands 320, 330 and 340, respectively. Of course, an alternate embodiment contemplates that the cards may be discarded into sequential positions of the secondary poker hands. In yet another alternate embodiment, cards discarded from the primary poker hand do not fill the secondary poker hand unless the player has wagered the maximum number of coins. Primary poker hand 112 is again populated, replacing the cards that were discarded therefrom with the 5h, 3s, and 8d in card positions 302, 303, and 304, respectively. The primary poker hand 112 is completed, and therefore, a payout for primary poker hand 112 and any completed secondary poker hands 114 is determined using payout schedule 32.

In this example, the payout is calculated for three of a kind in the primary poker hand 112 which amounts to, for example, nine (9) coins if three (3) coins were wagered. To continue play, the player activates machine 100, for example, by actuating start button 41, and actuates draw control button 36 signaling processor 12 to deal a new hand of cards to primary poker hand 112. The cards in secondary poker hands 320, 330, and 340 remain.

Figure 6:
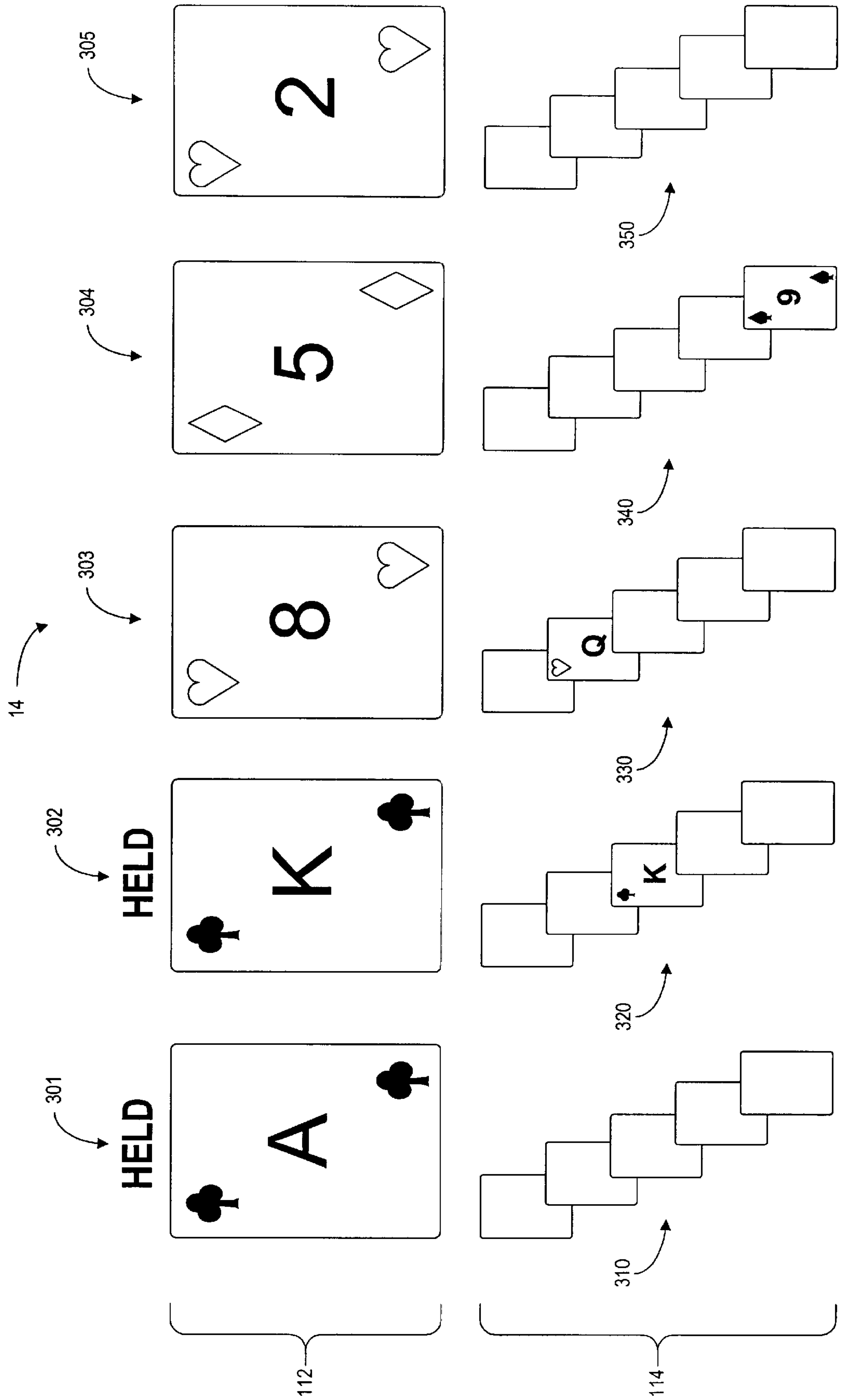

FIG. 6 shows a new primary poker hand 112. In this example, the player decides to hold the Ac and Kc in card positions 301 and 302, respectively, of primary poker hand 112. Thus, the player indicates that the 8h, 5d, and 2h in card positions 303, 304, and 305, respectively, are to be discarded by actuating the appropriate hold control buttons 34.

Figure 7:
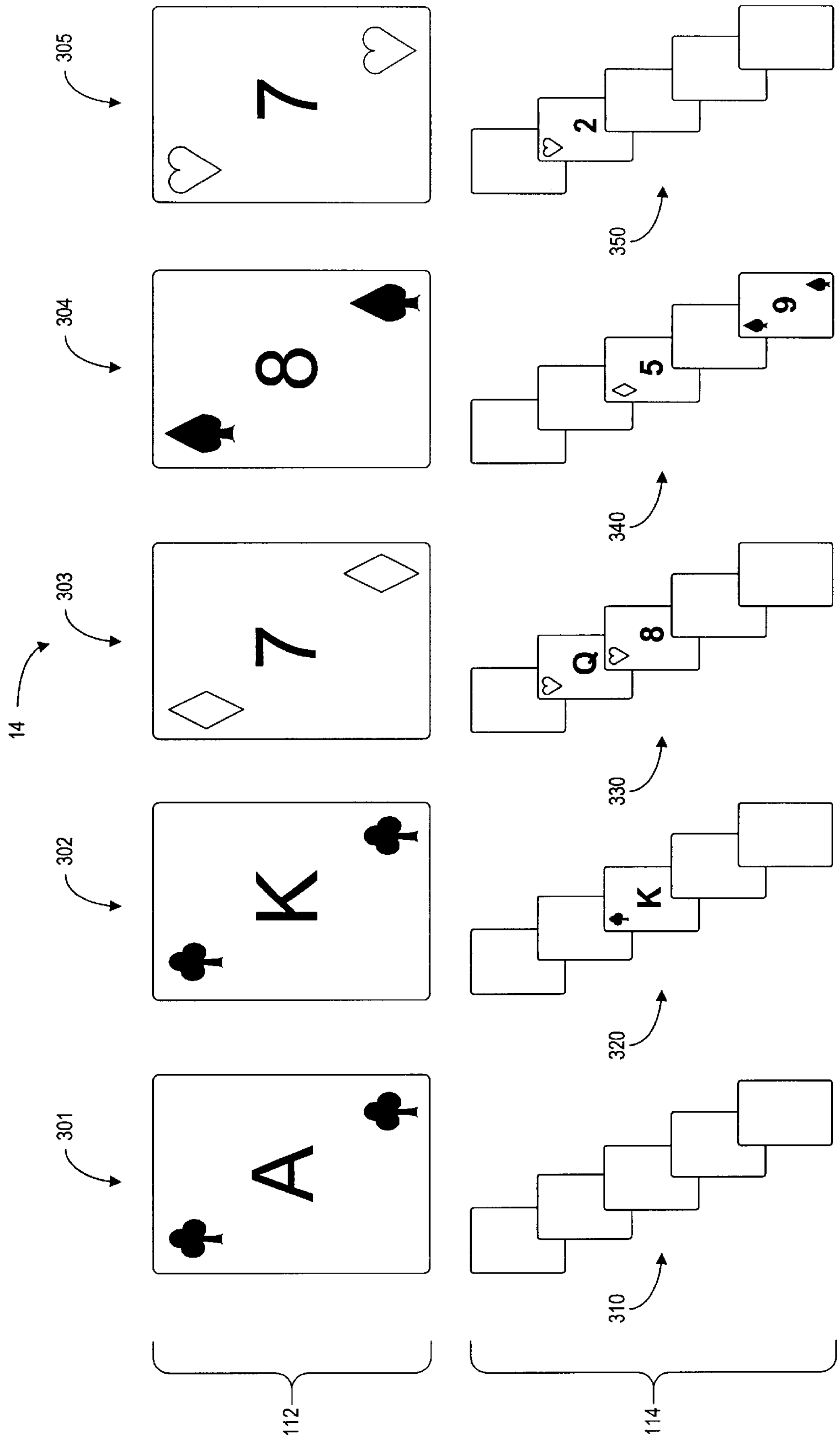

Referring to FIG. 7, upon actuating draw control button 36, the 8h, 5d, and 2h are discarded into random positions of secondary poker hands 330, 340, and 350, respectively. Primary poker hand 112 is again populated, replacing the cards that were discarded with the 7d, 8s, and 7h in card positions 303, 304, and 305, respectively. The primary poker hand 112 is completed, and therefore, a payout for the primary poker hand 112 and any completed secondary poker hands 114 is determined. In this example, there is no payout because the final primary poker hand 112 does not match any of the designated "outcomes" in payout schedule 32 (i.e., two pair or better are required for a payout) and none of the secondary poker hands 114 are complete. To continue play, the player activates machine 100 and presses draw control 36 signaling processor 12 to deal a new hand of cards to primary poker hand 112.

Figure 8:
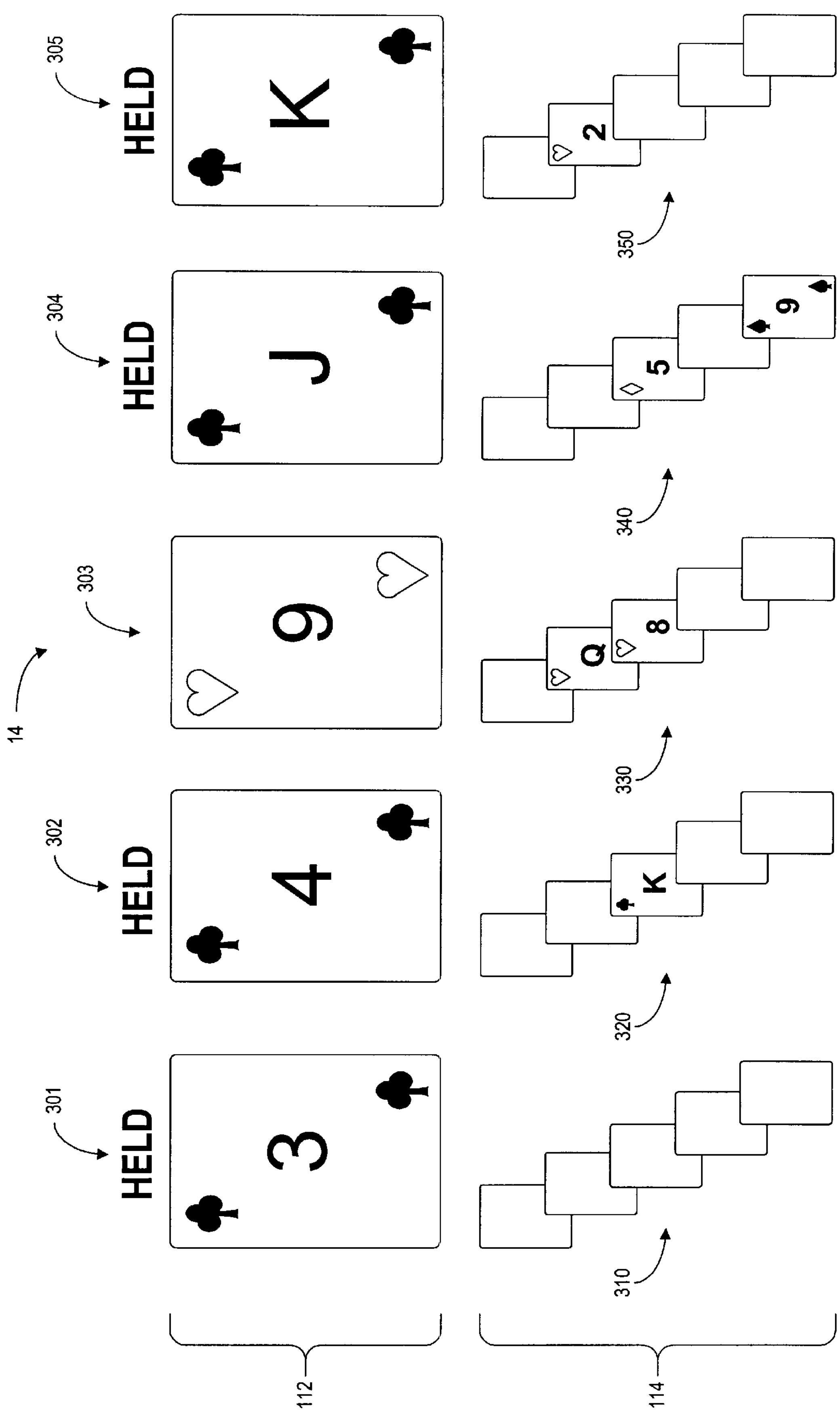
Figure 9:
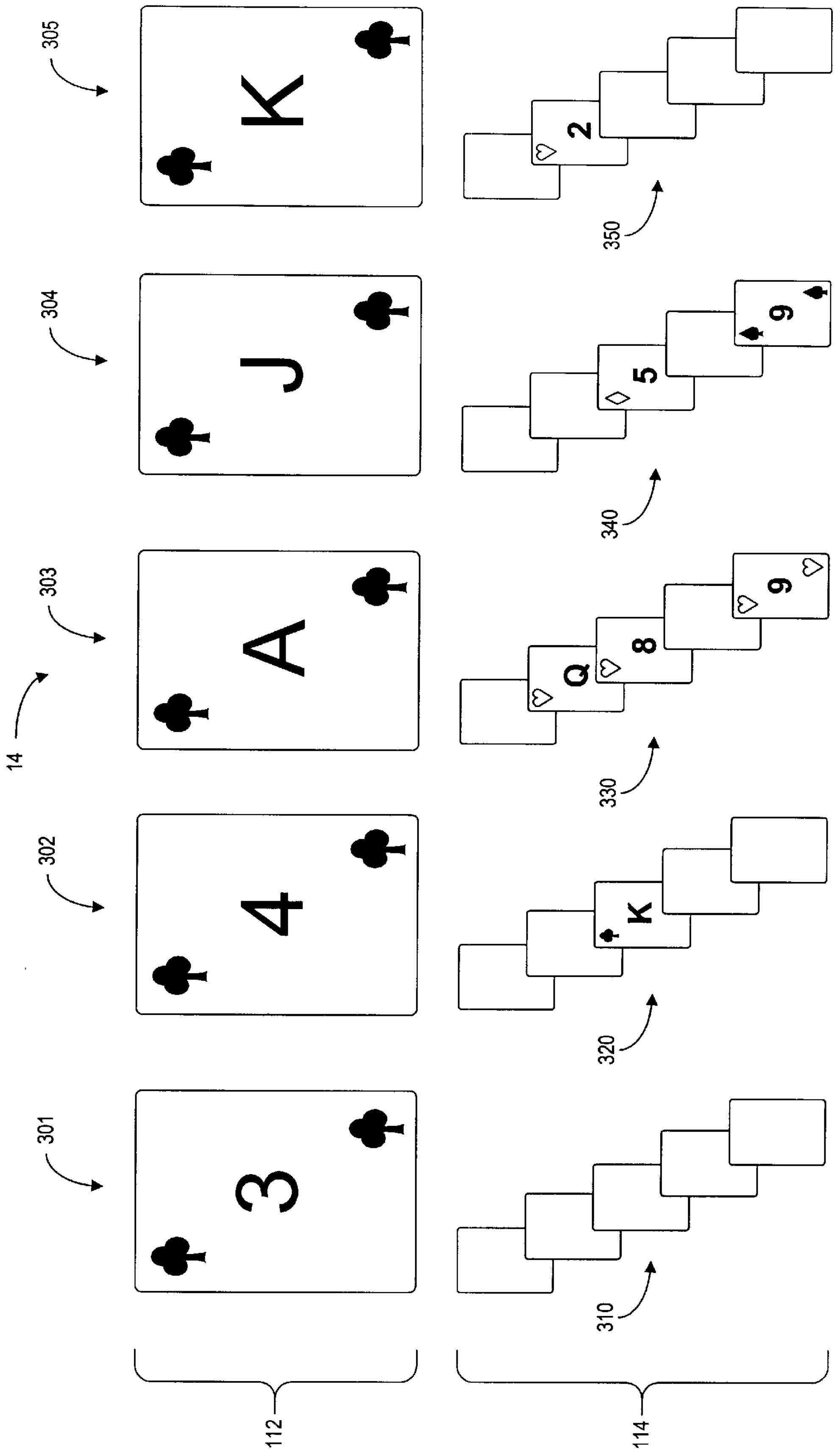

Referring to FIG. 8, the new primary poker hand 112 is shown, in which the player decides to hold the 3c, 4c, Jc, and Kc in card positions 301, 302, 304, and 305, respectively. Thus, the 9h in card position 303 is to be discarded. FIG. 9 shows that after the appropriate hold control buttons 34 are actuated, and upon actuating draw control button 36, the 9h is discarded into a random position of secondary poker hand 330. Primary poker hand 112 is again populated, replacing the card that was discarded therefrom with the Ac in card position 303. The primary poker hand 112 is completed, and therefore, a payout for the primary poker hand 112 and any completed secondary poker hands 114 is determined. The payout for the flush in the primary poker hand 112 amounts to, for example, eighteen (18) coins if three (3) coins were wagered. There is no payout for the secondary poker hands 114. To continue play, the player activates machine 100 and actuates draw control button 36 signaling processor 12 to deal a new hand of cards to primary poker hand 112.

Figure 10:
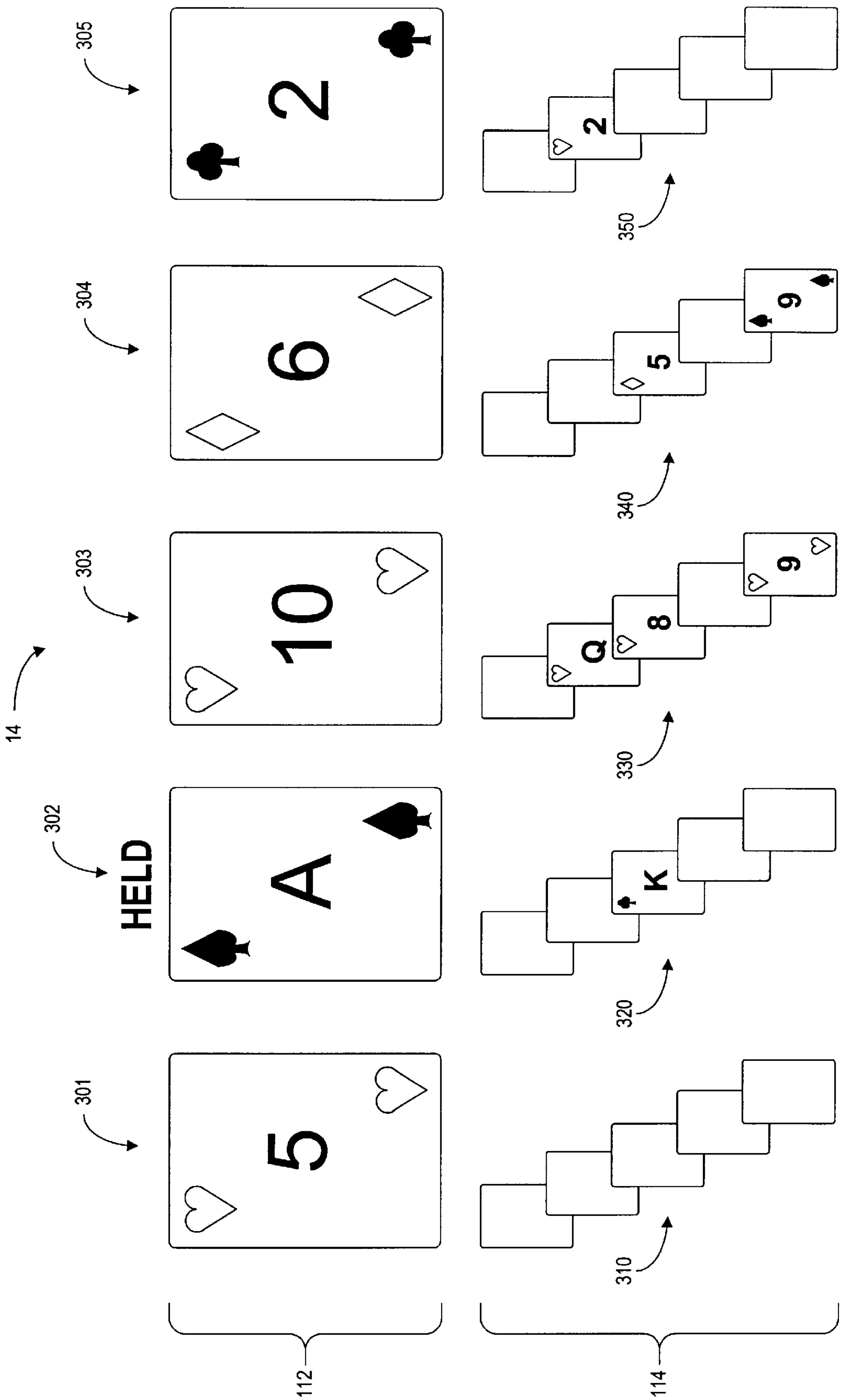
Figure 11:
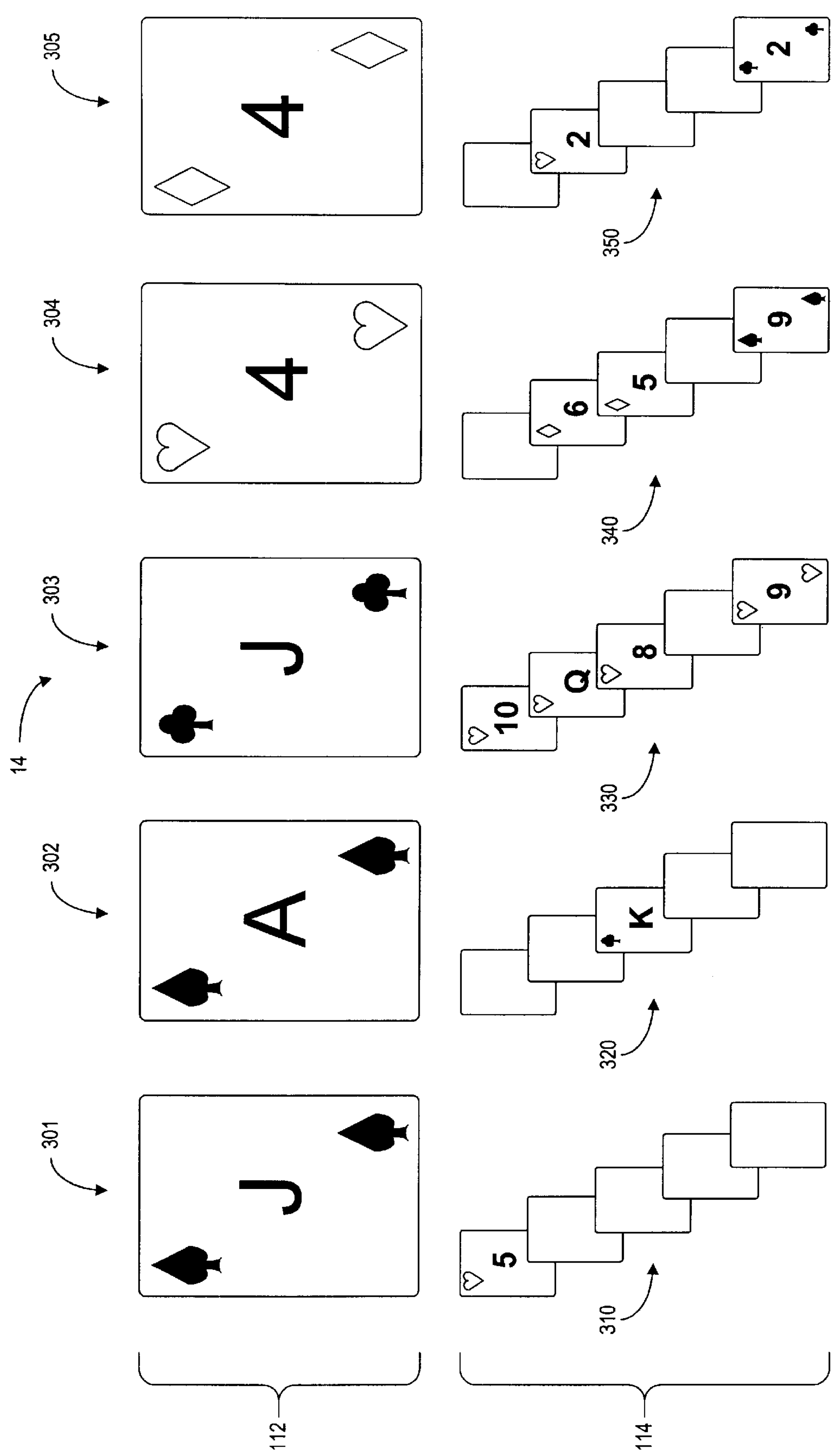

Referring to FIG. 10, the new primary poker hand 112 is shown, in which the player determines that it is best to hold the As in card position 302. Thus, the 5h, 10h, 6d, and 2c in card positions 301, 303, 304, and 305 are to be discarded to the secondary poker hands. Referring to FIG. 11, after determining which cards to hold and actuating the appropriate hold control buttons 34, the player actuates draw control button 36, and the 5h, 10h, 6d, and 2c are discarded into random card positions of secondary poker hands 310, 330, 340, and 350, respectively. Primary poker hand 112 is again populated, thereby replacing the cards that were discarded therefrom with the Js, Jc, 4h, and 4d in card position 301, 303, 304, and 305, respectively. The primary poker hand 112 is completed, and therefore, a payout for the primary poker hand 112 and any completed secondary poker hands 114 is determined. The payout is for two pair in the primary poker hand 112, which amounts to six (6) coins if three (3) coins were wagered. No winning outcomes were achieved in any of the secondary poker hands 114. To continue play, the player activates machine 100 and actuates draw control button 36.

Figure 12:
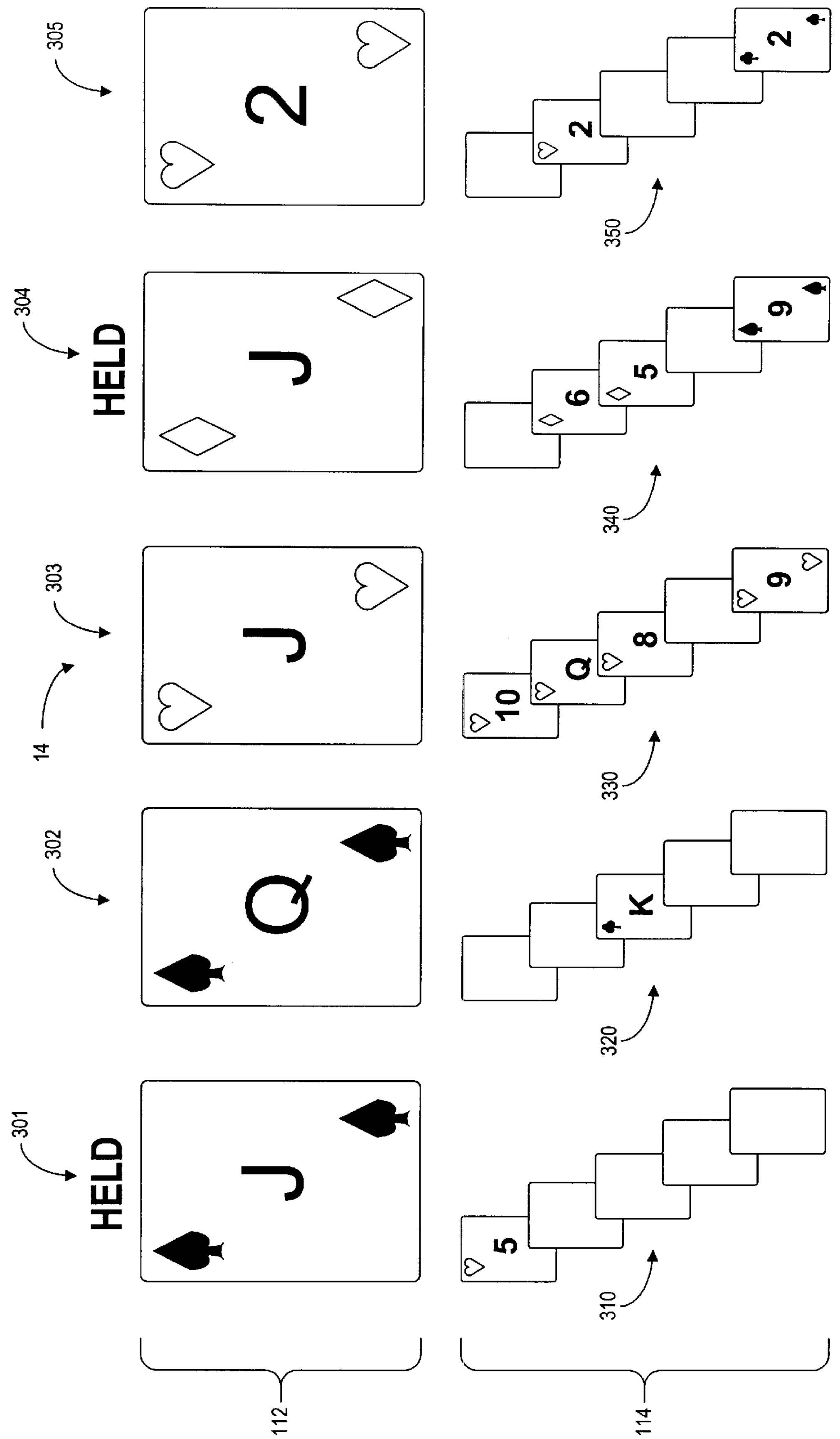

Referring to FIG. 12, a new primary poker hand 112 is dealt. In this example, the player has drawn three of a kind, i.e., Js, Jh, and Jd in card positions 301, 303, and 304, respectively. Ordinarily, the player would hold all three cards to earn a guaranteed payoff, e.g., nine (9) coins if three (3) coins were wagered.

However, there is a possibility that the Jh, if discarded, will drop into the empty position of secondary poker hand 330 resulting in a straight flush which has a higher payoff, i.e., fifty (50) coins. In this example, the player takes this chance by actuating the appropriate hold control buttons 34 in order to hold only the Js and Jd in card positions 301 and 304, respectively. Thus, the Qs, Jh, and 2h in card positions 302, 303, and 305, respectively, are to be discarded.

Figure 13:
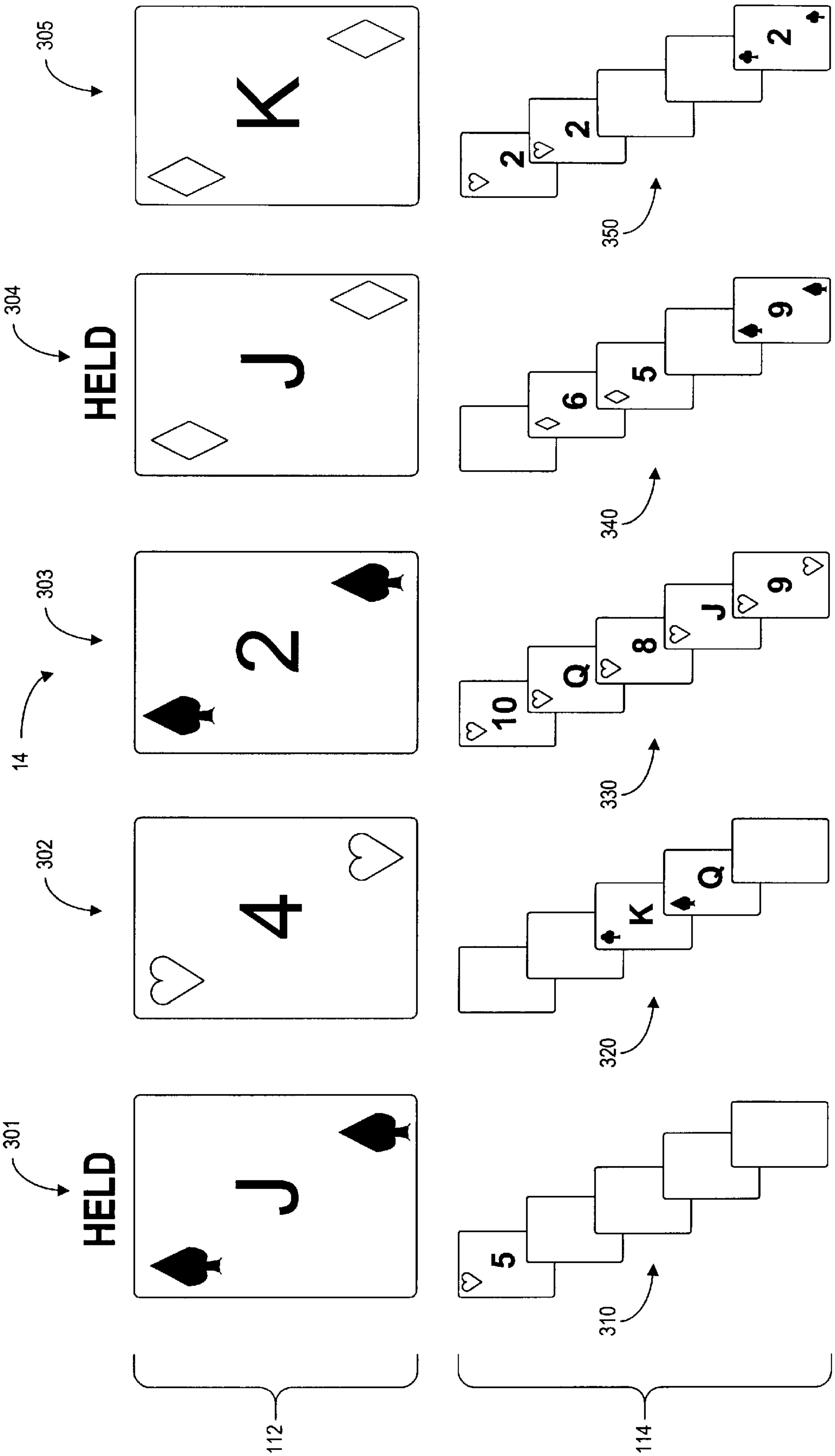

Referring to FIG. 13, upon actuating draw control button 36, the Qs, Js, and 2h are discarded into random positions of their respective secondary poker hands 320, 330, and 350. Primary poker hand 112 is again populated, replacing the cards that were discarded therefrom with the 4h, 2s, and Kd in card positions 302, 303, and 305, respectively. The primary poker hand 112 is completed, and therefore, a payout for the primary poker hand 112 and secondary poker hands 114 is determined. Here, there is no payout for the primary poker hand 112, but there is a payout of fifty (50) coins for the straight flush in secondary poker hand 114 as anticipated. To continue play, the player activates machine 100, wagers, and actuates draw control button 36.

With continued reference to FIG. 13, it is seen that secondary poker hand 350 includes three of a kind, i.e., 2h, 2h, and 2s. As described above, an alternate embodiment of the present invention includes cashout control buttons 38 (see FIG. 2) permitting a player to have the option of taking a "discard bonus" before a particular secondary poker hand is completed (i.e., while a secondary poker hand has less than a full hand). Therefore, the player in this example may actuate the cashout control button 38 associated with secondary poker hand 350 at this time and receive a secondary hand bonus payout of five (5) coins for the three of a kind, i.e., 2h, 2h, and 2s. If the player chooses to "cash out" secondary poker hand 350 at this time, the playing cards in that hand are removed. In this example, the player decides not to cash out in the hopes of building a more profitable secondary hand 350, such as four of a kind or a full house.

Another embodiment of video poker machine 100 includes a single cashout control button (not shown) which, if activated, would signal the machine to poll all secondary poker hands 114 each time a set of new cards are dealt to the primary poker hand 112 and to make a payout for any ranking hands achieved. The payout would be made even if the winning combination of cards is acquired before the secondary poker hand is complete.

Figure 14:
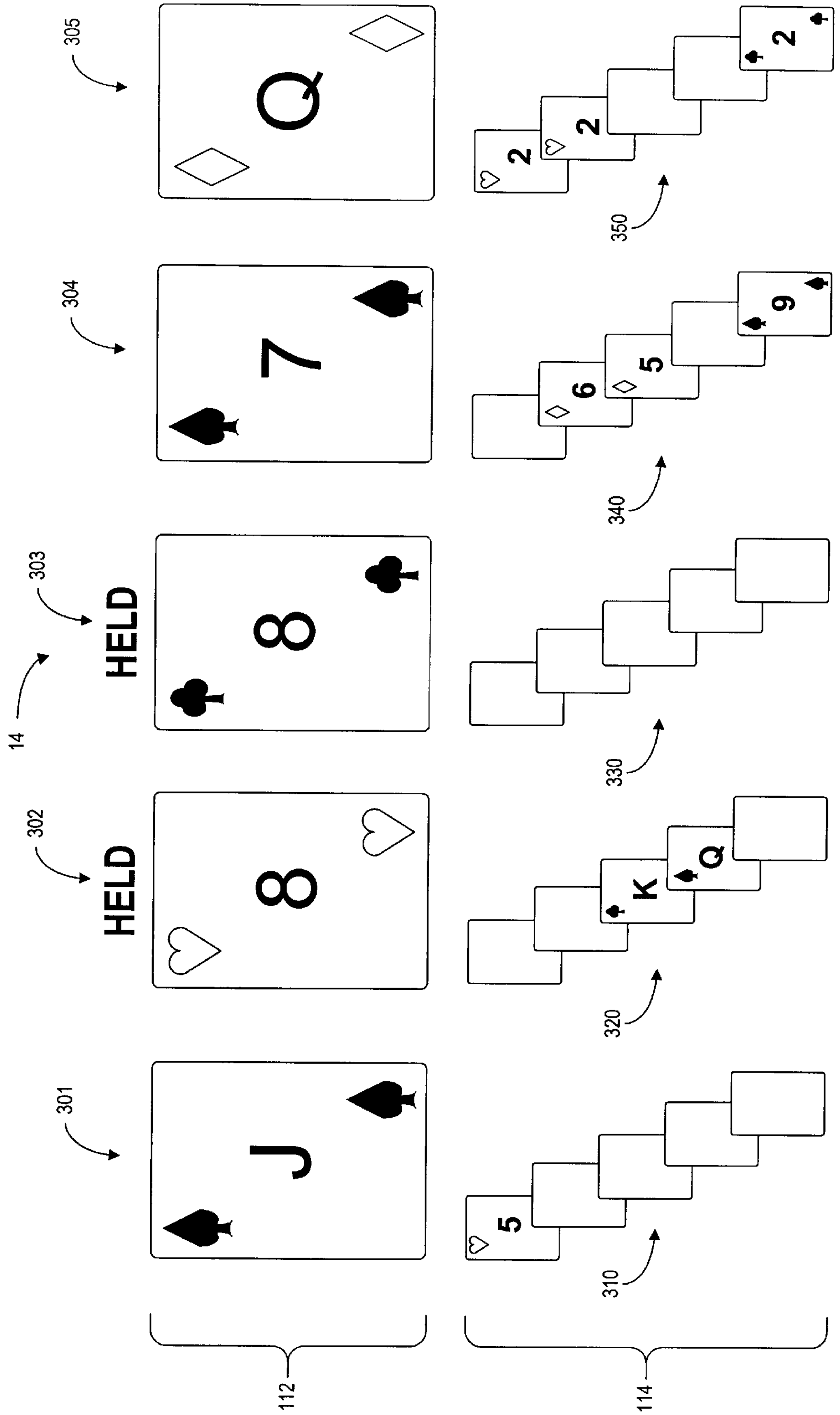

Referring now to FIG. 14, a player is dealt a new primary poker hand 112 and decides to hold the 8h and 8c in card positions 302 and 303, respectively. Thus, the Js, 7s, and Qd in card positions 301, 304, and 305, respectively, are to be discarded by actuating the appropriate hold control buttons 34.

Figure 15:
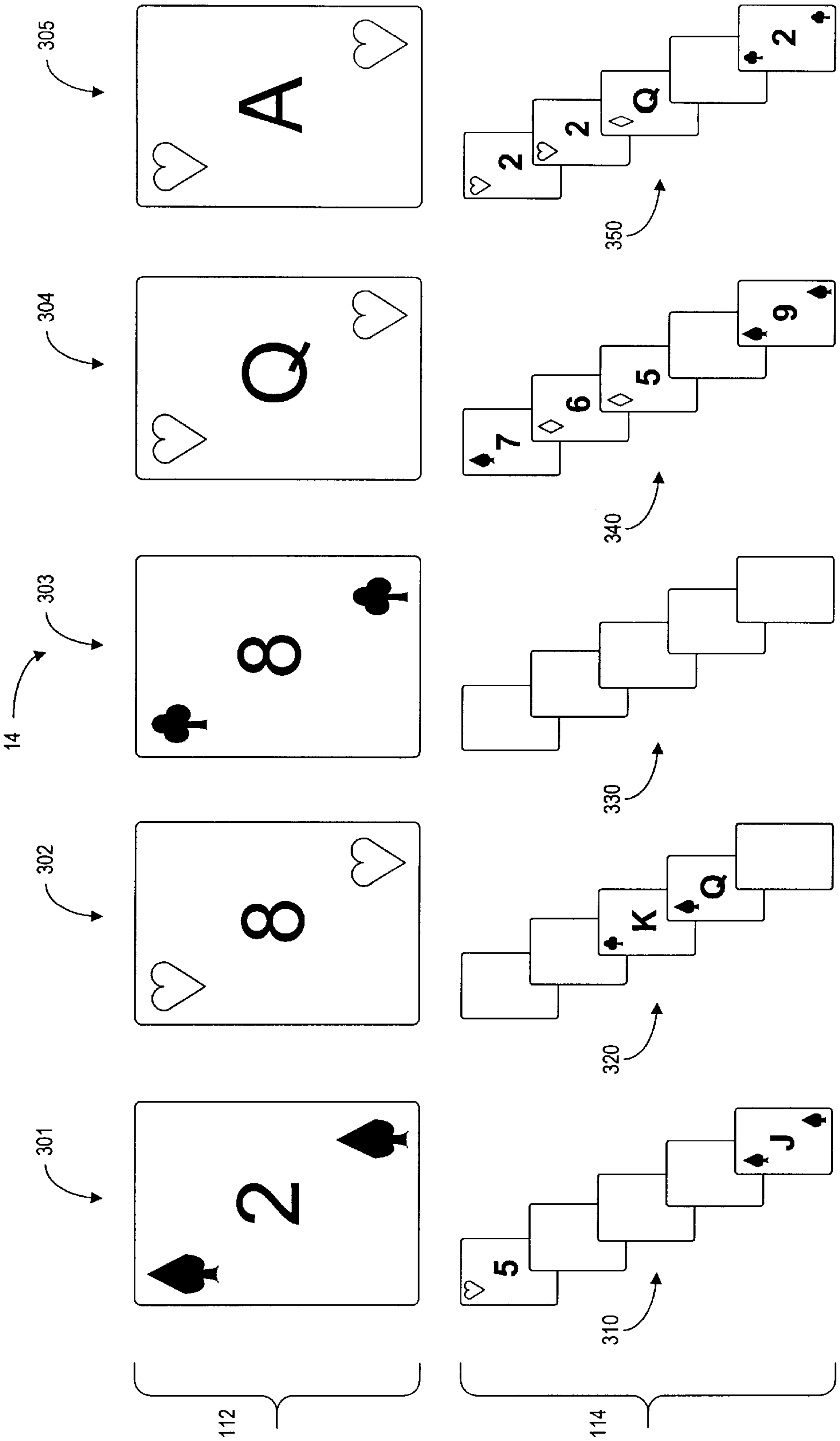

Referring to FIG. 15, upon actuating draw control button 36, the Js, 7s, and Qd are discarded into random positions of secondary poker hands 310, 340, and 350, respectively. Primary poker hand 112 is again populated, replacing the cards that were discarded therefrom with the 2s, Qh, and Ah in card positions 301, 304, and 305, respectively. The primary poker hand 112 is completed, and therefore, a payout for primary poker hand 112 and secondary poker hand 114 is determined. In this example, there is no payout for primary poker hand 112 or for secondary poker hand 114. However, the player is encouraged to extend play because secondary poker hand 340 is close to earning a payout of ten (10) coins for a straight and secondary poker hand 350 is close to earning a payout of twenty-five (25) coins for a four of a kind or twenty (20) coins for a full house. To continue play, the player activates machine 100, wagers, and actuates draw control button 36.

Figure 16:
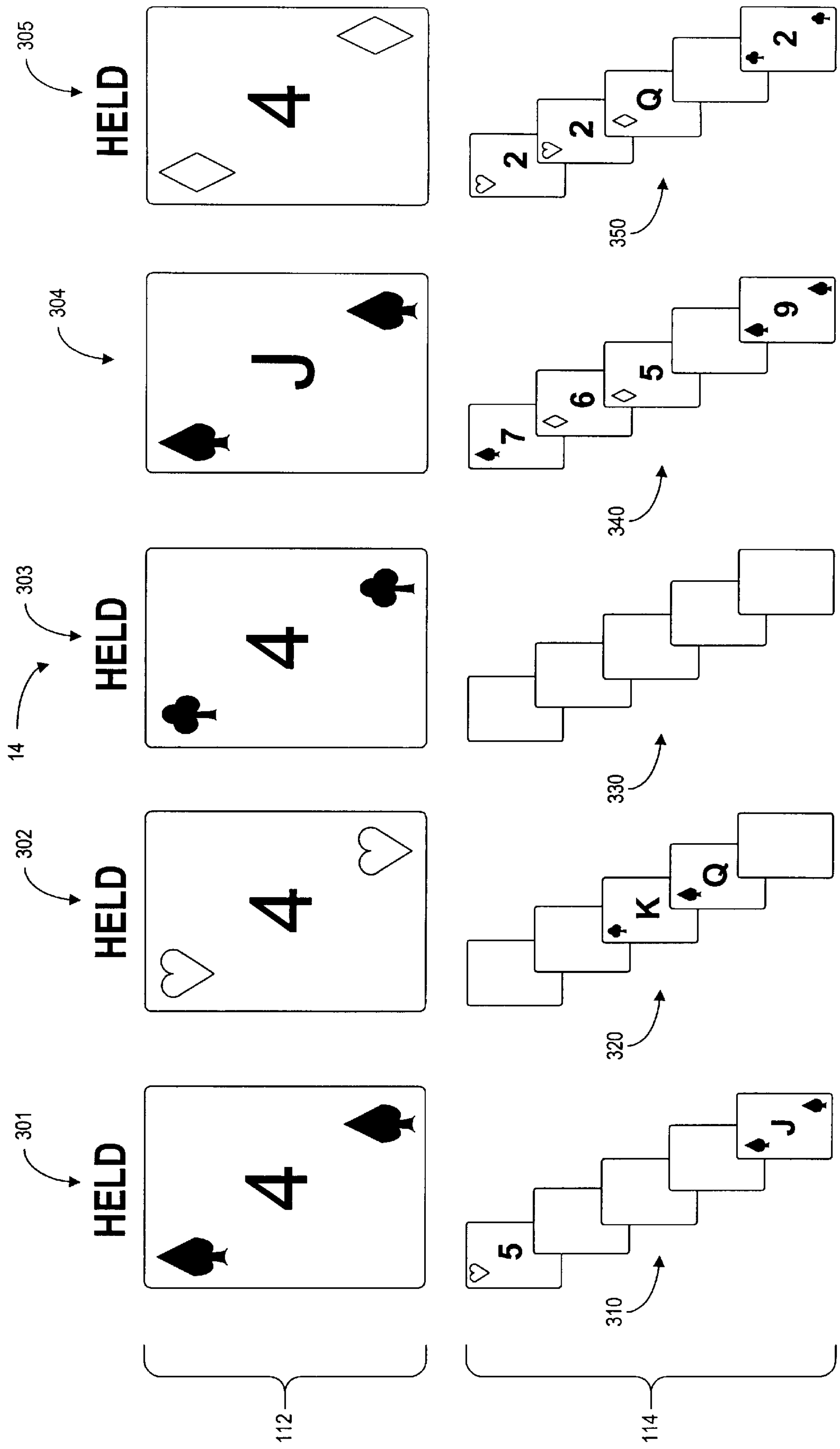
Figure 17:
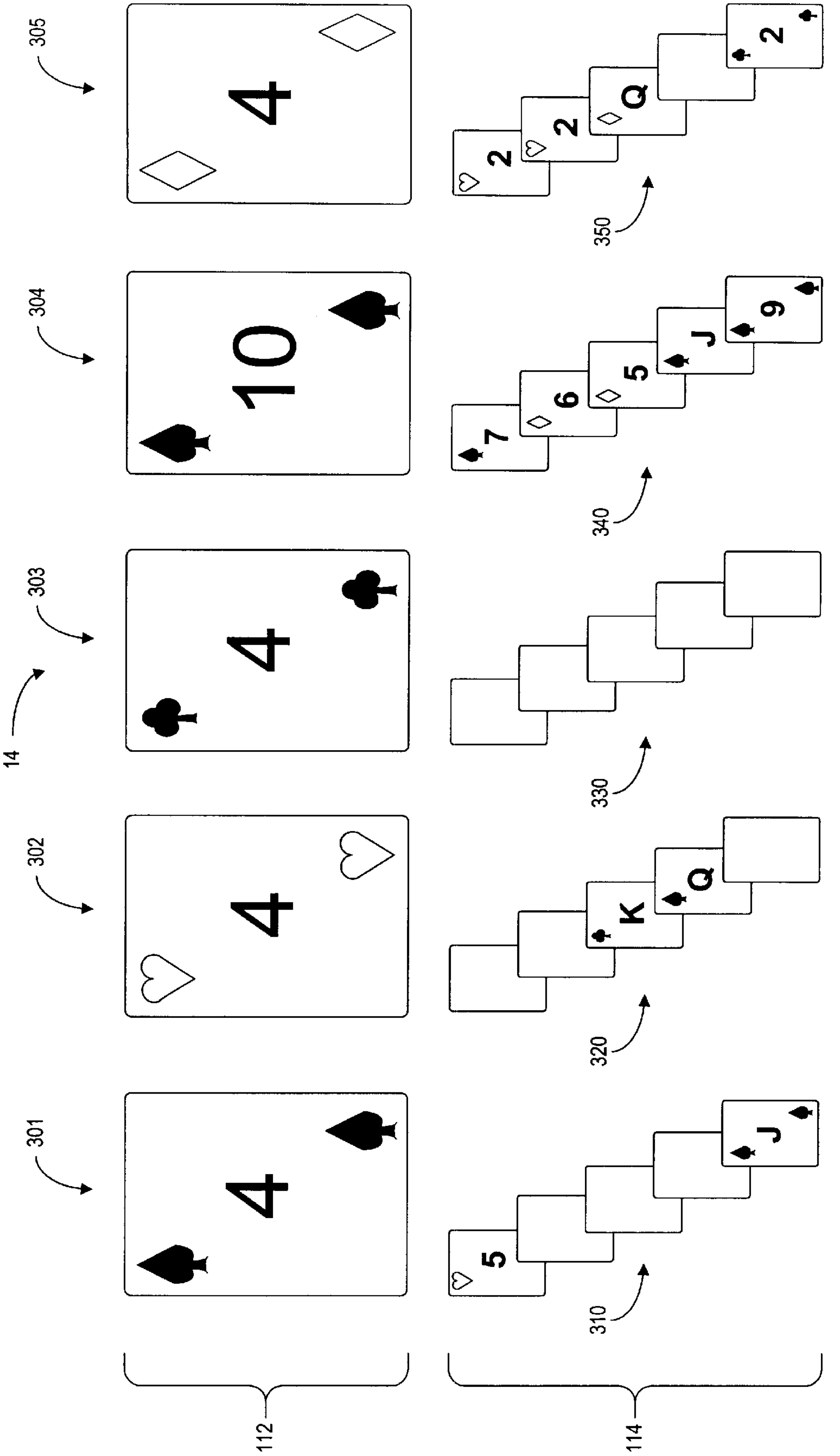

Referring to FIG. 16, a player receives a new primary poker hand 112 and decides to hold the 4s, 4h, 4c, and 4d in card positions 301, 302, 303, and 305, respectively. Thus, the Js in card position 304 is to be discarded by actuating the appropriate hold control buttons 34. Referring to FIG. 17, the player actuates draw control button 36, and the Js is discarded into a random position of secondary poker hand 340. Primary poker hand 112 is again populated, replacing the card that was discarded therefrom with the 10s in card position 304. The primary poker hand 112 is completed, and therefore, a payout for the primary and secondary poker hands 112 and 114 is determined. The payout is for four of a kind in primary poker hand 112, which equates to seventy-five (75) coins if three (3) coins were wagered. No payout has been achieved for any of the secondary poker hands 114. To continue play, the player activates machine 100, wagers, and actuates draw control button 36.

Figure 18:
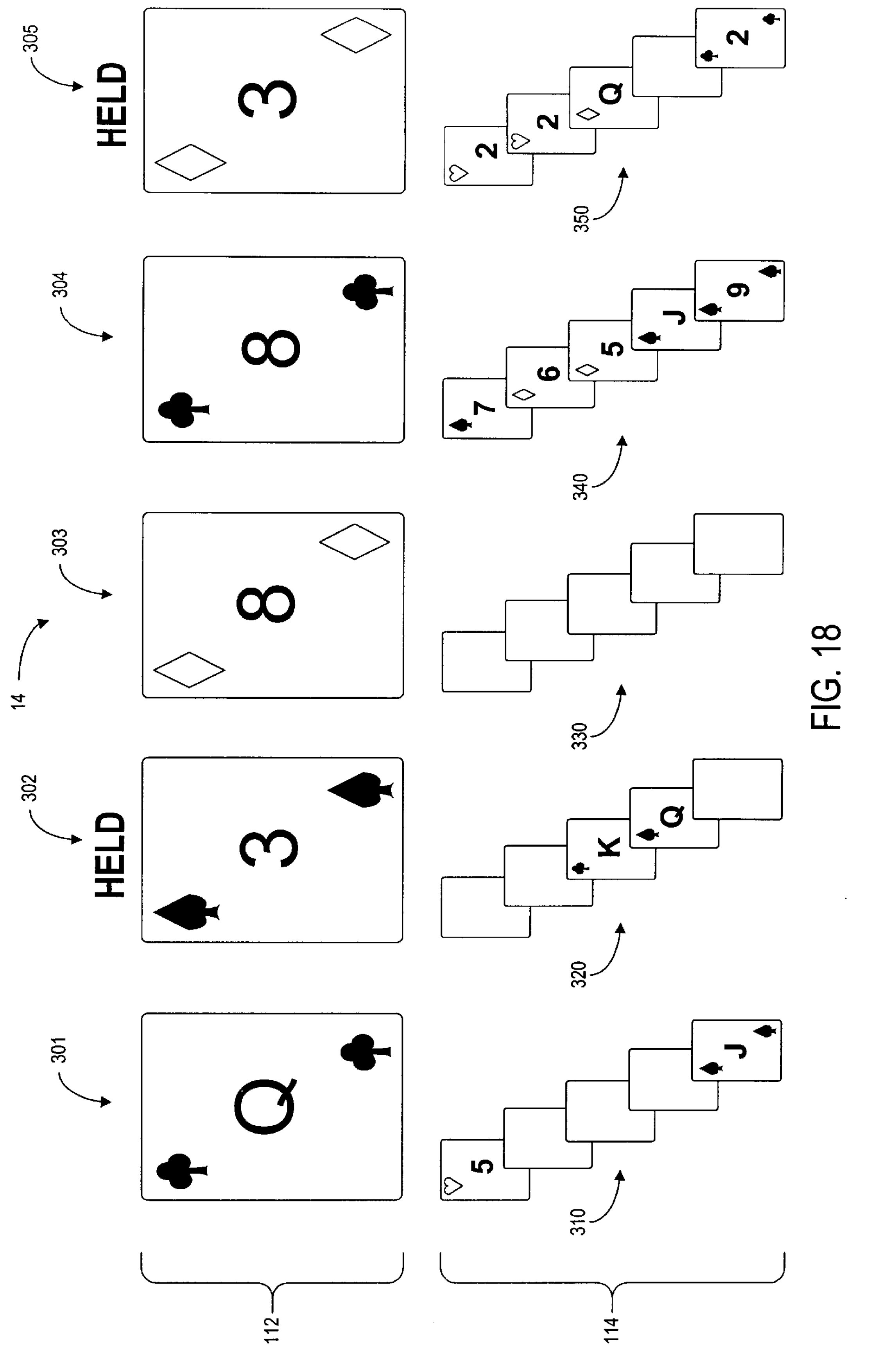

Referring to FIG. 18, a new primary poker hand 112 is dealt, which shows that the player has drawn two pairs, i.e., a pair of threes (3s and 3d) and a pair of eights (8d and 8c). With two pairs the player is guaranteed to receive a payout, e.g., six (6) coins if three (3) coins were wagered. However, the player may decide to try an alternative strategy by discarding the 8c into secondary poker hand 340, thus taking the chance that it will replace the Js. If the player executes this strategy, it may result in a straight and, therefore, a higher payout of ten (10) coins. Those skilled in the art will recognize that the player has a one-in-five chance of obtaining the straight. In this example, the player chooses the alternative strategy by holding the 3s and 3d in card positions 302 and 305, respectively, of primary poker hand 112. The Qc, 8d, and 8c in card positions 301, 303, and 304 are discarded.

Figure 19:
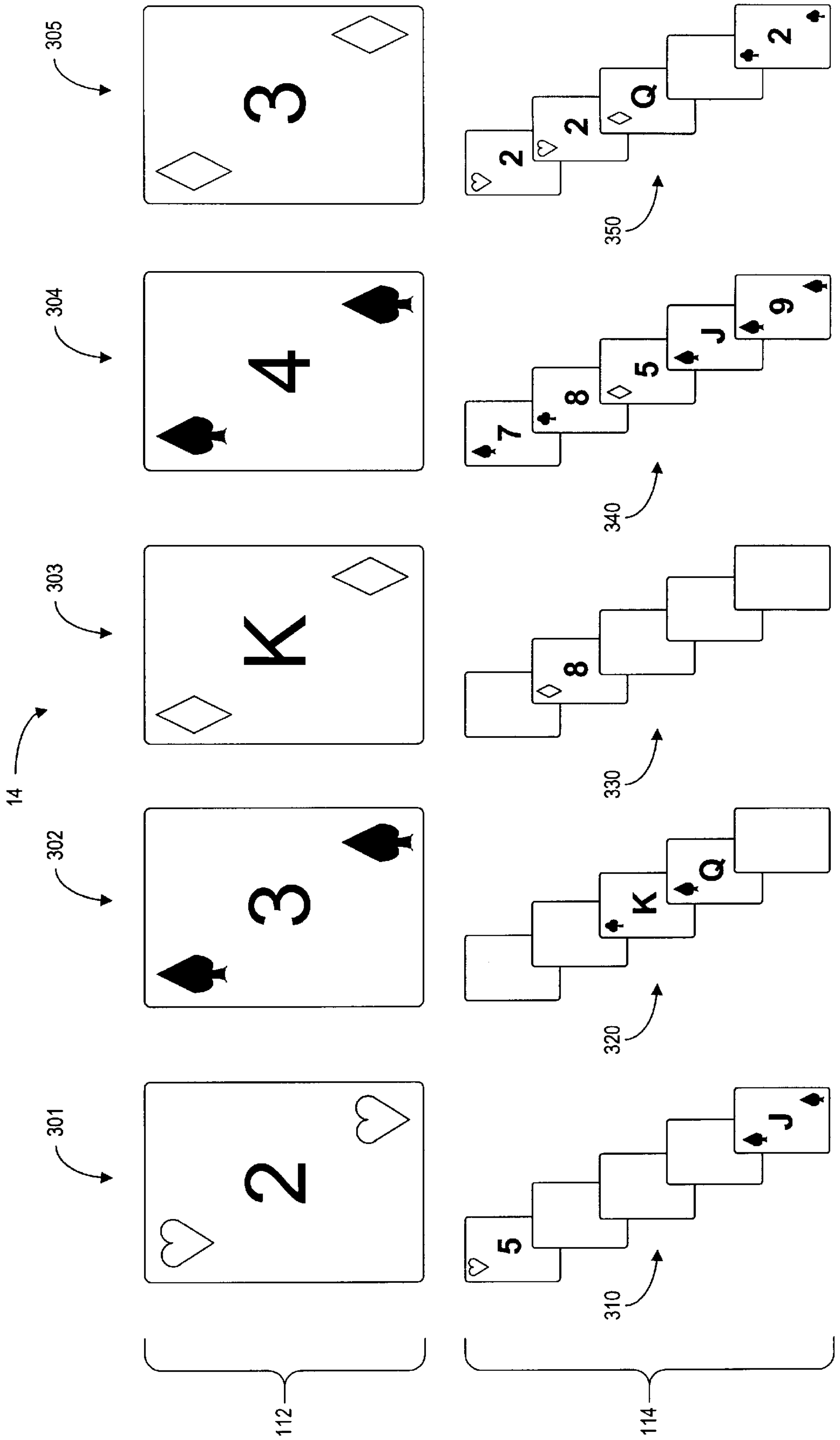

Referring now to FIG. 19, upon actuating the appropriate hold control buttons 34 and draw control button 36, the Qc, 8d, and 8c are discarded into random positions of secondary poker hands 310, 330, and 340, respectively. Primary poker hand 112 is again populated, replacing the cards that were discarded therefrom with the 2h, Kd, and 4s in card positions 301, 303, and 304, respectively. Much to the player's chagrin, the 8c did not replace the Js as desired, but instead replaced the 6d. With the primary poker hand 112 completed, the payout is determined. There is no payout for primary poker hand 112 and there is no payout for any of the secondary poker hands 114. It is readily apparent that the player gave up the "guaranteed" payout in primary poker hand 112 to take a chance on a straight in secondary poker hand 340.

Another embodiment comprises subsequent derivative poker hands, for example a third or even a fourth level of poker hands that receive playing cards from the secondary and tertiary poker hands, respectively. For example, each secondary poker hand may have a third, or tertiary, poker hand which receives the cards discarded from the secondary poker hand. When a playing card in a secondary poker hand is replaced by a discard card from the primary poker hand, the replaced playing card is placed into one of the card positions in the tertiary poker hand. Similar to the examples provided above and illustrated in FIGS. 4 through 19, there may be a tertiary poker hand associated with each of the secondary poker hands. In addition, the playing cards discarded from each secondary poker hand may be randomly discarded into the associated tertiary poker hand. When, for example, the poker game includes tertiary poker hands, the secondary poker hand payout schedule 106 of payout schedule 32 (see FIG. 2) may apply to the tertiary poker hand in the same manner as it applies to the secondary poker hand as described above. Of course, other payout schemes may be used. Any playing cards replaced in a tertiary poker hand is either deleted or falls into a pile of cards on the bottom of the display. Alternatively, a further level of poker hands may be used in a similar manner as the tertiary poker hands. Yet another embodiment provides for extra bonuses in the event a winning hand is achieved in one hand of play or for achieving a winning hand in at least one secondary poker hand in a predefined number of sequential games.

Figure 20:
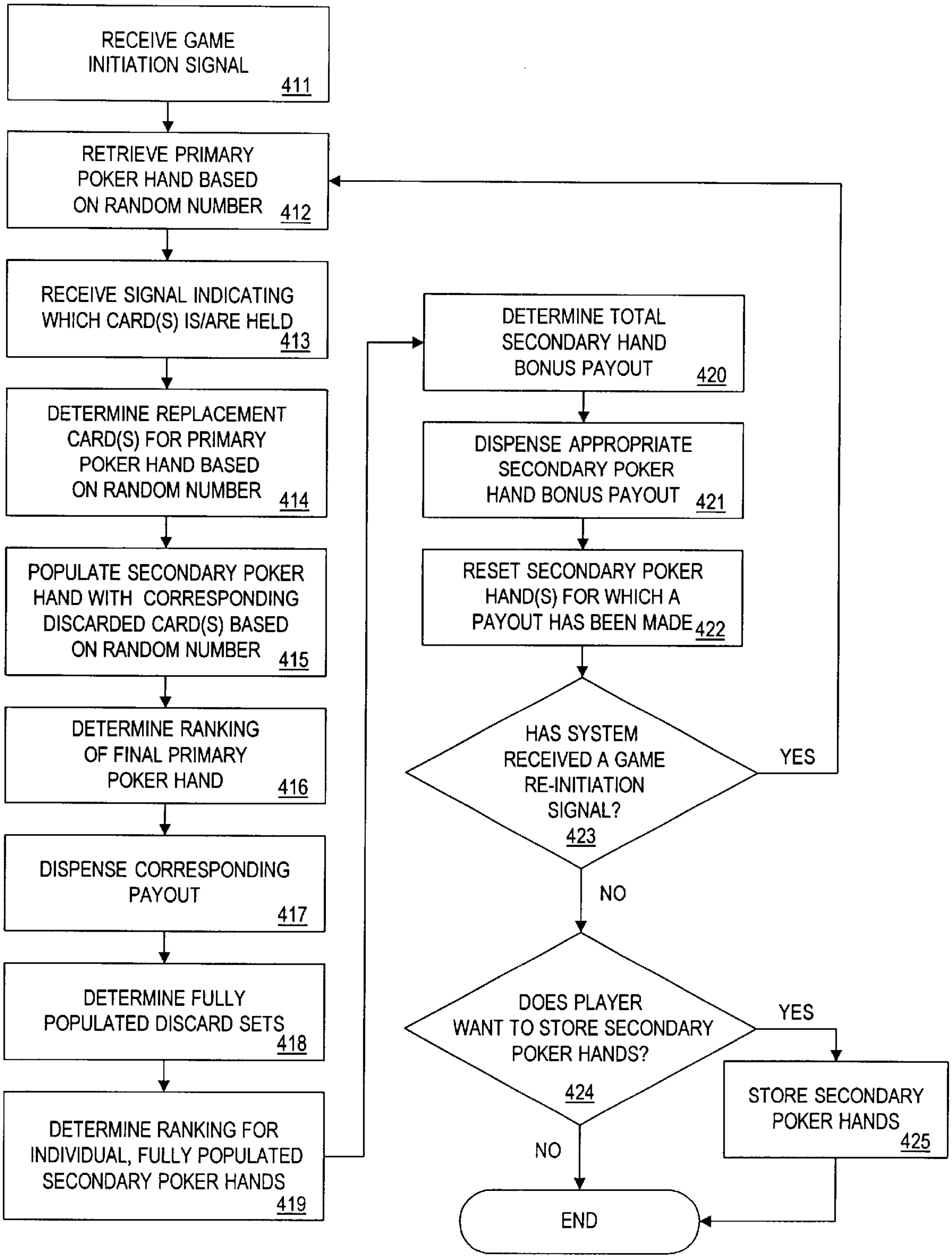
FIG. 20 is a flowchart depicting a process in accordance with an embodiment of the present invention.

Referring now to FIG. 20, a flowchart illustrates a process which functions according to an embodiment of the present invention. FIGS. 1 and 2 should be considered in conjunction with FIG. 20 for the description that follows. The process followed during a typical game play is controlled by program 30 and includes the step 411 of receiving a game initiation signal from starting controller 40. This occurs when a player inserts a coin into currency acceptor 28 or, alternatively, inserts a player tracking card into card reader 44 of player card interface 42 and actuates start button 41. Step 412 of the process includes generating a primary poker hand 112 by dealing playing cards from one or more decks of cards under the control of random number generator 16 and processor 12.

At step 413, the player's choice of cards in the primary poker hand 112 that are to be "held" is received, for example, when the player actuates one or more hold control buttons 34. The determination represents the player's discard strategy and signals processor 12 to move the cards not held, i.e., the discard cards, from the primary poker hand 112 to a temporary memory. Step 414 includes determining cards that are to replace those cards in the primary poker hand 112 that, as part of the discard strategy, were not held. At step 415, the cards that were placed in temporary memory are transferred into random positions of the associated secondary poker hands 114. More specifically, each card that is discarded from the primary poker hand 112 is placed in random position of a secondary poker hand that corresponds to the card position in primary poker hand 112. For example, a playing card discarded from card position 301 will be randomly placed in secondary poker hand 310, a playing card from card position 302, will be randomly placed in secondary poker hand 320, etc. (see FIG. 4.)

During step 416, the ranking of the final primary poker hand 112 is determined so as to establish the payout, based on payout schedule 32, due to the player. After the payout has been established, processor 12 signals hopper controller 24 to actuate hopper 26 for dispensing the proper number of coins or tokens into tray 110 for the player's receipt at step 417. Alternatively, processor 12 stores the payout in temporary memory and the player has the option of using these winnings as wagers in future game play.

At step 418, the processor 12 determines which secondary poker hands 114 are fully populated (i.e., which secondary poker hands have five (5) cards). During step 419, the ranking of each fully populated secondary poker hand (310 through 350) is determined so as to establish the payout due to the player for each hand based on payout schedule 32. After each payout has been established, the total secondary poker hand payout is determined in step 420 by summing all individual secondary poker hand 114 payouts. Similar to payouts based on the primary poker hand 112, processor 12 signals hopper controller 24 to actuate hopper 26 for dispensing the proper number of coins or tokens into tray 110 for the player's receipt at step 420. Alternatively, processor 12 may store the payout in temporary memory and the player has the option of using these winnings as wagers in future game play.

At step 421, processor 12 resets (i.e., removes) the secondary poker hands for which a payout has been made in preparation for a new game. At step 423, the player has the option of continuing or discontinuing game play. The player continues game play by depositing the number of coins representing his wager or, if he has sufficient credits earned from earlier game play, transferring a wager from temporary memory through, for example, the actuation of start button 41. Thereafter, the player is returned to step 412 and is dealt a new primary poker hand of playing cards.

If the player chooses not to continue game play, processing proceeds to step 424 to give the player the option to store all secondary poker hands 114. If the player chooses the option to store the secondary poker hands 114, the secondary poker hands are stored at step 425. The secondary poker hands 114 can be stored, for example, onto a player tracking card or the data storage device 22. This option allows the player to resume game play at a later time, such as after the player has had time to rest or eat a meal.

Figure 21:
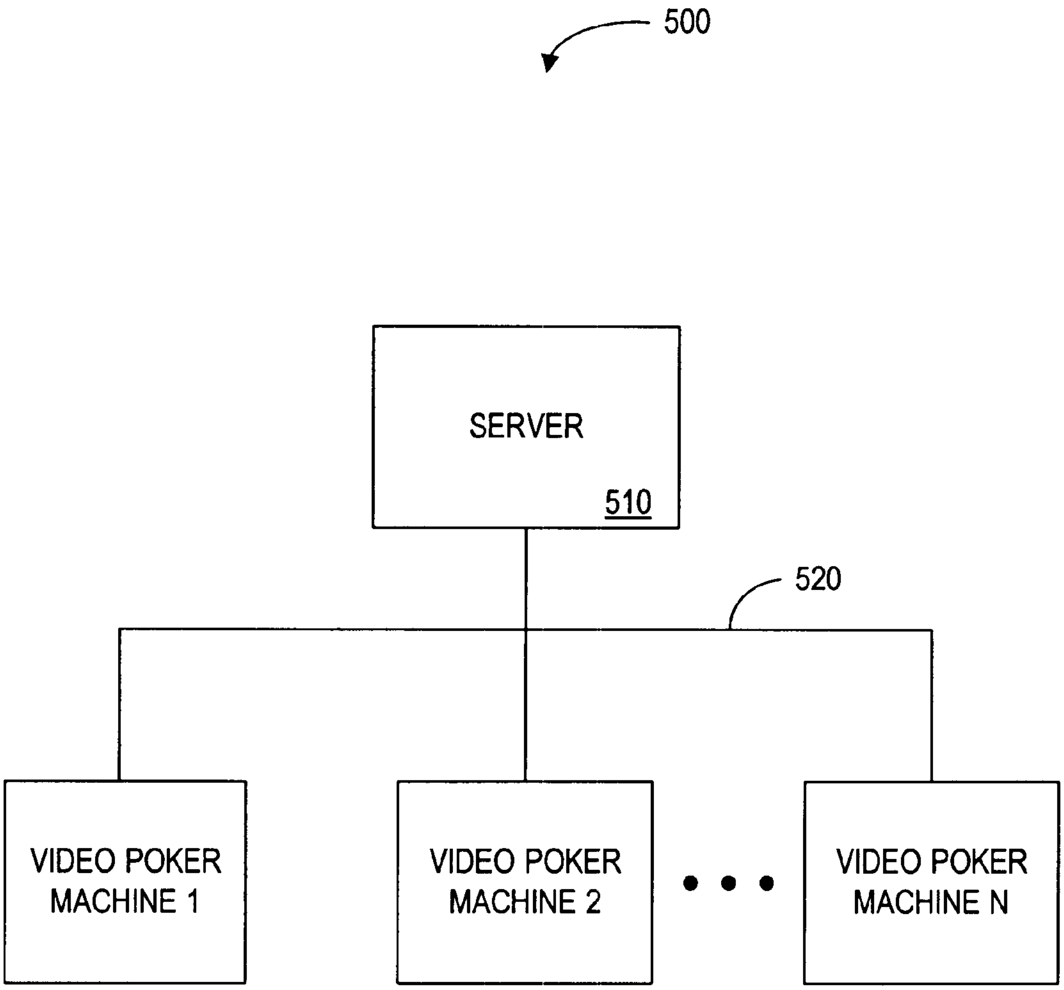
FIG. 21 is a schematic representation of a computer network configured in accordance with an embodiment of the subject invention.

Referring to FIG. 21, another embodiment of the present invention is schematically shown to include a gaming network 500 which comprises a network server 510 interconnected with a plurality of video poker machines through their network servers 50 (see FIG. 1). Network server 510 comprises a commercially available computer server, such as an IBM RS 6000 or the like. A data communications system 520, which may take the form of a local or wide area network, links the video poker machines to the server. Those skilled in the art will readily appreciate that the precise type of network is not of import and that the network may be wired or wireless. Server 510 allows central processing and storage of data related to the operation of each video poker machine. For example, instead of including a player card interface 42 on each video poker machine for storing a player's secondary poker hands 114 as described hereinabove, the player's secondary poker hands 114 may be stored in the network server 510 under a file name that identifies the player. When storing a player's secondary poker hands 114, the data may be stored in a specific database or under a player identifier, such as the code stored on the player's player tracking card, that is dedicated to that particular player. In this way, the stored data is readily retrievable for use by the player at a later time.

It is envisioned that the gaming network 500 can be expanded so that all or some of the data manipulation that is normally carried out by the video poker machine 100 is carried out by the network server 510, for example, data processing, random number generation, and data storage. In addition, instead of including currency handling devices 23, a player can be given credits by the casino that are deductible from the player's account stored in the memory of server 510. Such an embodiment can utilize more simplified video poker machines that include only the basic components necessary for game play, e.g., display 14, starting controller 40, player controls 18, network interface 50, and a minimal amount of processing power and memory.

It is further envisioned that expanded gaming services can be incorporated through the use of gaming network 500 which would provide greater convenience for players and larger profits for casinos. For example, network server 510 can include individualized player payout schedules, player gaming attribute variations, and player activity tracking.

It is clear from the foregoing disclosure, that the present inventive system and method for playing video poker engages a player during game play. In addition, the system and method encourages a high amount of game play while at the same time maintains acceptable payback percentages. Further, the system and method enables players to develop a variety of gaming strategies so as to generate more interesting and exciting playing action.

Although the system and method disclosed herein has been described with respect to various specific embodiments, it is apparent that modifications, changes and enhancements can be made thereto without departing from the spirit and scope of the invention as defined by the appended claims.

What is claimed is:

1. An apparatus, comprising:

a storage device; and a processor in communication with the storage device, the storage device storing a program for controlling the processor; and the processor operative with the program to:

receive a first wager for a first play of a poker game;

display a first primary poker hand;

receive a selection of first discard cards to be discarded from the first primary poker hand;

populate a secondary poker hand with the first discard cards;

populate the first primary poker hand to replace the first discard cards discarded therefrom, thereby forming a first final primary poker hand;

determine a payout based at least upon the first wager and the playing cards in the first final primary poker hand;

clear the display of the first final primary poker hand and preserve the secondary poker hand;

receive a second wager for a second play of the poker game;

populate a second primary poker hand with a second plurality of playing cards;

receive a selection of second discard cards to be discarded from the second primary poker hand; and populate further the secondary poker hand with the second discard cards.

2. A medium encoded with a program for implementing a method, said program for directing a device to perform the steps of:

receiving a first wager for a first play of a poker game;

displaying a first primary poker hand;

receiving a selection of first discard cards to be discarded from the first primary poker hand;

populating a secondary poker hand with the first discard cards;

populating the first primary poker hand to replace the first discard cards discarded therefrom, thereby forming a first final primary poker hand;

determining a payout based at least upon the first wager and the playing cards in the first final primary poker hand;

clearing the display of the first final primary poker hand and preserve the secondary poker hand;

receiving a second wager for a second play of the poker game;

populating a second primary poker hand with a second plurality of playing cards;

receiving a selection of second discard cards to be discarded from the second primary poker band; and populating further the secondary poker hand with the second discard cards.

3. A method, comprising:

actuating a means for dealing video poker cards on a video poker gaming device, thereby requesting and receiving a first primary poker hand;

viewing the first primary poker hand, wherein the primary poker hand comprises a plurality of primary cards and is associated with a plurality of secondary poker hands;

selecting which, if any, of the plurality of primary cards comprising the first primary poker hand to bold, thereby identifying first discard cards and first held cards;

actuating the means for dealing video poker cards, thereby requesting that the first discard cards be replaced with first replacement cards to form a first final primary poker hand and that at least one of the first discard cards be placed in at least one of the plurality of secondary poker hands;

receiving a payout for the first final primary poker hand, if the first final poker hand qualifies as a winning poker hand;

actuating the means for dealing video poker cards, thereby requesting that the first final primary poker hand be replaced with a second primary poker hand while the first discard cards remain in the at least one of the plurality of secondary poker hands;

selecting which, if any, of the plurality of primary cards comprising the second primary poker hand to hold, thereby identifying second discard cards and second held cards;

actuating the means for dealing video poker cards, thereby requesting that the second discard cards be replaced with second replacement cards to form a second final primary poker hand and that at least one of the second discard cards be placed in at least one of the plurality of secondary poker hands;

receiving a payout for the second final primary poker hand, if the second final primary poker hand qualifies as a winning poker hand; and receiving a payout for at least one of the plurality of secondary poker hands that contain at least one of the first discard cards and at least one of the second discard cards, if the at least one of the plurality of secondary poker hands qualifies as a winning poker hand.

4. A method, comprising:

causing at least one secondary poker hand that is associated with a primary poker game to be populated with at least one card discarded from a first primary poker hand;

causing the first primary poker hand to be replaced by a second primary poker hand while retaining the at least one secondary poker hand populated with the at least one card;

causing the at least one secondary poker hand to be populated with at least one card from the second primary poker hand; and causing a prize to be provided to a player associated with the at least one secondary poker hand that was populated with the at least one card from the first primary poker hand and the at least one card from the second primary poker hand if the at least one secondary poker hand qualifies as a winning poker hand.

5. An apparatus, comprising:

a storage device; and a processor in communication with the storage device, the storage device storing a program for controlling the processor; and the processor operative with the program to perform a method comprising:

causing at least one secondary poker hand that is associated with a primary poker game to be populated with at least one card discarded from a first primary poker hand;

causing the first primary poker hand to be replaced by a second primary poker hand while retaining the at least one secondary poker hand populated with the at least one card;

causing the at least one secondary poker hand to be populated with at least one card from the second primary poker hand; and causing a prize to be provided to a player associated with the at least one secondary poker hand that was populated with the at least one card from the first primary poker hand and the at least one card from the second primary poker hand if the at least one secondary poker hand qualifies as a winning poker hand.

6. A medium encoded with a program operative to direct a device to perform a method comprising:

causing at least one secondary poker hand that is associated with a primary poker game to be populated wit at least one card discarded from a first primary poker hand;

causing the first primary poker hand to be replaced by a second primary poker hand while retaining the at least one secondary poker hand populated with the at least one card;

causing the at least one secondary poker hand to be populated with at least one card from the second primary poker band; and causing a prize to be provided to a player associated with the at least one secondary Faker band tat was populated with the at least one card from to first primary poker hand and the at least one card from the second primary poker hand if die at least one secondary poker hand qualifies as a winning poker hand.

7. A method, comprising:

populating a primary set of card positions with a first set of initial cards;

identifying at least one discarded card from the first set of initial cards;

replacing the at least one discarded card from the first set of initial cards with replacement cards to form a final set of cards;

determining a payout based on at least the final set of cards;

populating the primary set of card positions with a second set of initial cards;

identifying at least one discarded card from the second set of initial cards; and populating at least one secondary set of card positions with at least the at least one discarded card from the first set of initial cards and the at least one discarded card from the second set of initial cards.

8. The method of claim 7, in which populating the at least one secondary set of card positions comprises:

populating the at least one secondary set of card positions with the at least one discarded card from the first set of initial cards; and replacing the at least one discarded card from the first set of initial cards populating the at least one secondary set of card positions with the at least one discarded card from the second set of initial cards.

9. The method of claim 8, in which replacing comprises:

replacing all cards populating the at least one secondary set of card positions with the at least one discarded card from the second set of initial cards.

10. The method of claim 7, which populating the at least one secondary set of card positions comprises;

populating a first secondary set of card positions with the at least one discarded card from the first set of initial cards; and populating a second secondary set of card positions with the at least one discarded card from the second set of initial cards.

11. The method of claim 7, in which the at least one discarded card from the first set of initial cards comprises a first discarded card from the first set of initial cards and a second discarded card from the first set of initial cards, and in which populating the at least one secondary set of card positions comprises:

populating a first secondary set of card positions with the first discarded card from the first set of initial cards; and populating a second secondary set of card positions with the second discarded card from the first set of initial cards.

12. The method of claim 7, in which populating the at least one secondary set of card positions comprises:

populating one secondary set of card positions of the at least one secondary set of card positions with the at least one discarded card from the first set of initial cards and the at least one discarded card from the second set of initial cards.

13. A method comprising:

conducting a first primary game of video poker comprising the steps of:

populating a primary set of card positions with a first set of initial cards, identifying at least one discarded card from the first set of initial cards, and replacing the at least one discarded card from the first set of initial cards with replacement cards to form a final set of cards;

conducting a second primary game of video poker comprising the steps of:

populating the primary set of card positions with a second set of initial cards, and identifying at least one discarded card from the second set of initial cards; and populating at least one secondary set of card positions with at least the at least one discarded card from the first primary game and the at least one discarded card from the second primary game.

14. The method of claim 13, in which populating the at least one secondary set of card positions comprises:

populating the at least one secondary set of card positions with the at least one discarded card from the first primary game; and replacing the at least one discarded card from the first primary game populating the at least one secondary set of card positions with the at least one discarded card from the second primary game.

15. The method of claim 14, wherein in which replacing comprises:

replacing all cards populating the at least one secondary set of card positions with the at least one discarded card from the second primary game.

16. The method of claim 13, further comprising:

evaluating the at least one secondary set of card positions to determine whether the cards populating the at least one secondary set of card positions comprise a winning poker hand.

17. The method of claim 16, further comprising:

causing a prize to be provided to a player associated with the at least one secondary set of card positions if the cards populating the at least one secondary set of card positions comprise a winning poker hand.

18. The method of claim 17, further comprising:

determining an amount wagered on the second primary game by the player; and determining the prize based on the amount.

19. The method of claim 16, in which evaluating comprises:

evaluating the at least one secondary set of card positions when all of the card positions in the at least one secondary set of card positions have been populated.

20. The method of claim 16, in which evaluating comprises:

evaluating the at least one secondary set of card positions when a request for the evaluation is received from a player.

21. The method of claim 20, in which the request forte evaluation is received before all of the card positions of the at least one secondary set of card positions have been populated.

22. The method of claim 13, further comprising:

storing an indication of discarded cards populating the at least one secondary set of card positions in association with a player identifier.

23. The method of claim 22, in which storing comprises:

storing the indication on at least one of a player tracking card, a gaming device, and a gaming device server.

24. The method of claim 13, in which the at least one secondary set of card positions comprises a plurality of secondary sets of card positions, each secondary set of card positions of the plurality of secondary sets of card positions respectively associated with a card position of the primary set of card positions.

25. The method of claim 24, in which populating the at least one set of secondary card positions comprises:

determining the card position of the primary set of card positions of a discarded card; and populating the secondary set of card positions associated with the card position with the discarded card.

26. The method of claim 13, in which populating the at least one secondary set of card positions comprises:

receiving an indication from a player to populate a particular one of the at least one secondary set of card positions with a discarded card; and populating the indicated secondary set of card positions with the discarded card.

27. The method of claim 13, in which populating the at least one secondary set of card positions comprises:

populating a first secondary set of card positions with the at least one discarded card from the first primary game; and populating a second secondary set of card positions with the at least one discarded card from the second primary game.

28. The method of claim 13, in which the at least one discarded card from the first primary game comprises a first discarded card from the first primary game and a second discarded card from the first primary game, and in which populating the at least one secondary set of card positions comprises:

populating a first secondary set of card positions with the first discarded card from the first primary game; and populating a second secondary set of card positions with the second discarded card from the first primary game.

29. The method of claim 13, in which populating the at least one secondary set of card positions comprises:

populating one secondary set of card positions of the at least one secondary set of card positions with the at least one discarded card from the first primary game and the at least one discarded card from the second primary game.

30. An apparatus, comprising:

a storage device; and a processor in communication with the storage device, the storage device storing a program for controlling the processor; and the processor operative with the program to perform a method comprising:

conducting a first primary game of video poker comprising the steps of:

populating a primary set of card positions with a first set of initial cards, identifying at least one discarded card from the first set of initial cards, and replacing the at least one discarded card from the first set of initial cards with replacement cards to form a final set of cards;

conducting a second primary game of video poker comprising the steps of:

populating the primary set of card positions with a second set of initial cards, and identifying at least one discarded card from the second set of initial cards; and populating at least one secondary set of card positions with at least the at least one discarded card from the first primary game and the at least one discarded card from the second primary game.

31. A medium encoded wit a program operative to direct a device to perform a method comprising:

conducting a first primary game of video poker comprising the steps of:

populating a primary set of card positions with a first set of initial cards, identifying at least one discarded card from the first set of initial cards, and replacing the at least one discarded card from the first set of initial cards with replacement cards to form a final set of cards;

conducting a second primary game of video poker comprising the steps of:

populating the primary set of card positions with a second set of initial cards, and identifying at least one discarded card from the second set of initial cards; and populating at least one secondary set of card positions with at least the at least one discarded card from the first primary game and the at least one discarded card from the second primary game.

* * * * *